(12) United States Patent
Lavalley et al.

(10) Patent No.: US 12,218,508 B2
(45) Date of Patent: Feb. 4, 2025

(54) ELECTRICAL GENERATOR WITH AN ELECTRICAL BUS CONNECTABLE TO DIFFERENT ELECTRICAL POWER SOURCES AND DIFFERENT LOADS

(71) Applicant: LaValley Industries, LLC, Bemidji, MN (US)

(72) Inventors: Jason Lavalley, Bemidji, MN (US); Douglas Coutlee, Bemidji, MN (US); Daniel Larson, Bemidji, MN (US); Marc Annacchino, Bemidji, MN (US); Don Peet, Bemidji, MN (US)

(73) Assignee: LaValley Industries, LLC, Bemidji, MN (US)

( * ) Notice: Subject to any disclaimer, the term of this patent is extended or adjusted under 35 U.S.C. 154(b) by 0 days.

(21) Appl. No.: 18/050,399

(22) Filed: Oct. 27, 2022

(65) Prior Publication Data
US 2023/0073847 A1    Mar. 9, 2023

Related U.S. Application Data

(63) Continuation of application No. 17/132,142, filed on Dec. 23, 2020, now Pat. No. 11,515,710.
(Continued)

(51) Int. Cl.
*H02J 3/46* (2006.01)
*E21B 7/02* (2006.01)
(Continued)

(52) U.S. Cl.
CPC ............... *H02J 3/46* (2013.01); *E21B 7/022* (2013.01); *E21B 7/046* (2013.01); *E21B 47/00* (2013.01); *F02B 63/044* (2013.01); *Y02E 20/14* (2013.01)

(58) Field of Classification Search
CPC .. Y02E 20/14; F02B 63/044; F02B 2063/045; F02B 63/04; F05D 2220/76; E21B 41/0085; H02J 3/46
See application file for complete search history.

(56) References Cited

U.S. PATENT DOCUMENTS

| | | | |
|---|---|---|---|
| 7,466,034 B2 | 12/2008 | Kang et al. | |
| 2006/0163878 A1* | 7/2006 | Anzioso | F24D 18/00 290/2 |

(Continued)

FOREIGN PATENT DOCUMENTS

| | | |
|---|---|---|
| EP | 3188335 A1 | 7/2017 |
| WO | 2019152981 A1 | 8/2019 |

OTHER PUBLICATIONS

International Search Report and Written Opinion issued in PCT/IB2020/062409, dated Apr. 5, 2021.

*Primary Examiner* — Ryan Johnson
(74) *Attorney, Agent, or Firm* — Merchant & Gould P.C.

(57) ABSTRACT

An electrical generator that is configured to simultaneously output different types of electrical power so that electrically powered components that require different types of electrical power can be simultaneously powered by the electrical generator. The electrical generator can be used at any location where electrically powered components that require different types of electrical power are utilized. Instead of or in addition to outputting different types of electrical power, the electrical generator can also be configured to output at least one type of electrical power as well as a cooling liquid for use in cooling an external heat generating component.

19 Claims, 20 Drawing Sheets

Related U.S. Application Data

(60) Provisional application No. 62/953,670, filed on Dec. 26, 2019.

(51) Int. Cl.
  *E21B 7/04* (2006.01)
  *E21B 47/00* (2012.01)
  *F02B 63/04* (2006.01)

(56) References Cited

U.S. PATENT DOCUMENTS

| | | |
|---|---|---|
| 2006/0270280 A1 | 11/2006 | Sodemann et al. |
| 2012/0292992 A1 | 11/2012 | Williams |
| 2014/0277791 A1 | 9/2014 | Lenard et al. |
| 2014/0375064 A1* | 12/2014 | Koeneman ............... F01P 3/00 290/1 A |
| 2016/0128239 A1* | 5/2016 | Mulcahy ............ H05K 7/20927 363/141 |
| 2017/0342816 A1 | 11/2017 | LaValley et al. |
| 2018/0301906 A1* | 10/2018 | Qureshi ................... H02J 3/32 |
| 2018/0305036 A1 | 10/2018 | Vondrell et al. |
| 2019/0128253 A1* | 5/2019 | Ihde ....................... F04D 25/02 |

* cited by examiner

ELECTRICAL GENERATOR WITH AN ELECTRICAL BUS CONNECTABLE TO DIFFERENT ELECTRICAL POWER SOURCES AND DIFFERENT LOADS

FIELD

This technical disclosure relates to an electrical generator that can simultaneously output different types of electrical power, as well as output a thermal control fluid for use in thermal control of a component that may or may not be electrically connected to one of the electrical power outputs of the electrical generator.

BACKGROUND

The use of electrical generators to provide electrical power to components is known. One example use of an electrical generator is on a job site where line power (also known as utility power) may not be present or where the electrical generator is used in place of line power/utility power. In some instances, different components at a job site may require different types of electrical power, in which case separate electrical generators may be used to power the different components.

SUMMARY

An electrical generator and associated methods are described herein where the electrical generator is configured to simultaneously output different types of electrical power so that electrically powered components that require different types of electrical power can be simultaneously powered by the electrical generator. The electrical generator can be used at any location where electrically powered components that require different types of electrical power are utilized. Instead of or in addition to outputting different types of electrical power, the electrical generator can also be configured to output at least one type of electrical power as well as a thermal control fluid that can include, but is not limited to, a liquid, gas, or mixture thereof for use in thermal control (heating and/or cooling) of an external component.

In one embodiment, the electrical generator is configured to generate and output a modulated electrical power that is output at a modulated electrical power output (which may also be referred to as a variable frequency and/or variable amplitude power output), as well as configured to generate and output an export (or standard) electrical power that is output at an export electrical power output (which may also be referred to as a synchronous electrical power output). An electrically powered component that requires modulated electrical power can be powered from the modulated electrical power output. An electrically powered component that requires export/standard/synchronous electrical power may also be simultaneously powered from the export electrical power output.

In one embodiment, the electrical generator can also be provided with a thermal control system and can output a thermal control fluid, which can be a liquid, gas, or mixture thereof, for thermal control of a component at the job site. For example, the thermal control fluid can be a cooling fluid used to cool one of the electrically powered components receiving electrical power from the electrical generator. In another embodiment, the thermal control fluid can be used to cool or heat an electrical component that is not electrically powered by the electrical generator. After exchanging heat with the component, the thermal control fluid can be pumped back to the electrical generator for heat exchange before being returned back to the component for additional thermal control. In one embodiment, the heat exchange of the thermal control fluid can occur entirely within the electrical generator via a heat exchanger that is internal to the electrical generator. In another embodiment, the thermal control fluid can be directed into a heat exchanger that is external to the electrical generator but fluidly connected to the electrical generator to receive the thermal control fluid for heat exchange before the thermal control fluid is directed back into the electrical generator. In still another embodiment, the thermal control fluid can be directed through both an internal heat exchanger and an external heat exchanger.

In another embodiment, a plurality of user interface modules can be provided where each user interface module can be individually removably installed on the electrical generator to control operation of the electrical generator. In one embodiment, each user interface module can be associated with a particular electrically powered component to be powered by the modulated electrical power to appropriately control the modulated electrical power at the modulated electrical power output based on the particular electrically powered component connected to the modulated electrical power output. In another embodiment, each user interface module can be associated with a particular electrically powered component to be powered by the export electrical power to appropriately control the export electrical power at the export electrical power output based on the particular electrically powered component connected to the export electrical power output. The user interface modules can be changed out based on the electrically powered component connected to (or to be connected to) the modulated electrical power output and/or to the export electrical power output.

In one embodiment described herein, an electrical generator can include an engine having a mechanical output, a first electrical power output that outputs a first type of electrical power, and a second electrical power output that outputs a second type of electrical power, where the second type of electrical power differs from the first type of electrical power. Conversion components are connected to the mechanical output and to the first and second electrical power outputs, where the conversion components are configured to convert the mechanical output into the first type of electrical power and the second type of electrical power. The first type of electrical power output at the first electrical power output can be direct current electrical power, and the second type of electrical power output at the second electrical power output can be synchronous alternating current electrical power. Alternatively, the first type of electrical power output at the first electrical power output can be modulated alternating current electrical power, and the second type of electrical power output at the second electrical power output can be synchronous alternating current electrical power. In another embodiment, the first type of electrical power output at the first electrical power output can be direct current electrical power, and the second type of electrical power output at the second electrical power output can be modulated alternating current electrical power. In another embodiment, the electrical generator can have more than two electrical power outputs with any combination of modulated alternating current electrical power, synchronous alternating current electrical power, and direct current electrical power.

In another embodiment described herein, an electrical generator can include an engine having a mechanical output, conversion components connected to the mechanical output that are configured to convert the mechanical output into at least one alternating current that is output from at least one alternating current output, and a thermal control system that can output a thermal control fluid, which can be a liquid, gas or mixture thereof, from the electrical generator for cooling or heating an external component. The thermal control system can include a tank configured to contain a thermal control fluid, a pump connected to the tank, a heat exchanger connected to the pump, and a first flow path between the thermal control system and a thermal control fluid outlet connector that can be connected to in order to direct thermal control fluid to a component external to the electrical generator. In this embodiment, the electrical generator not only provides electrical power (for example modulated electrical power and/or export electrical power) but also provides a thermal control fluid for thermal control of a component that is external to the electrical generator.

In another embodiment described herein, a system can include an electrical generator as described herein, a first component of a horizontal directional drilling system connected to the first electrical power output of the electrical generator, and a second component of a horizontal directional drilling system connected to the second electrical power output of the electrical generator.

In another embodiment described herein, a system can include an electrical generator as described herein, and a plurality of user interface modules. Each user interface module is individually removably installable on the electrical generator to control operation of the electrical generator, and each user interface module is configured to control the electrical power that is output at the electrical power output whereby the electrical power differs for each user interface module.

In another embodiment described herein, a method can include connecting an electric drive motor of an implement/ device including, but not limited to, a pit pump, to an electrical power output of an electrical generator controlled by a first user interface module. Thereafter, the first user interface module is removed and a second user interface module is installed that is configured to operate with a second electrically operated implement other than the electric drive motor of the first implement. The electric drive motor of the first implement is disconnected from the electrical power output of the electrical generator, and the second electrically operated implement is connected to the electrical power output of the electrical generator.

DRAWINGS

Figure 15:
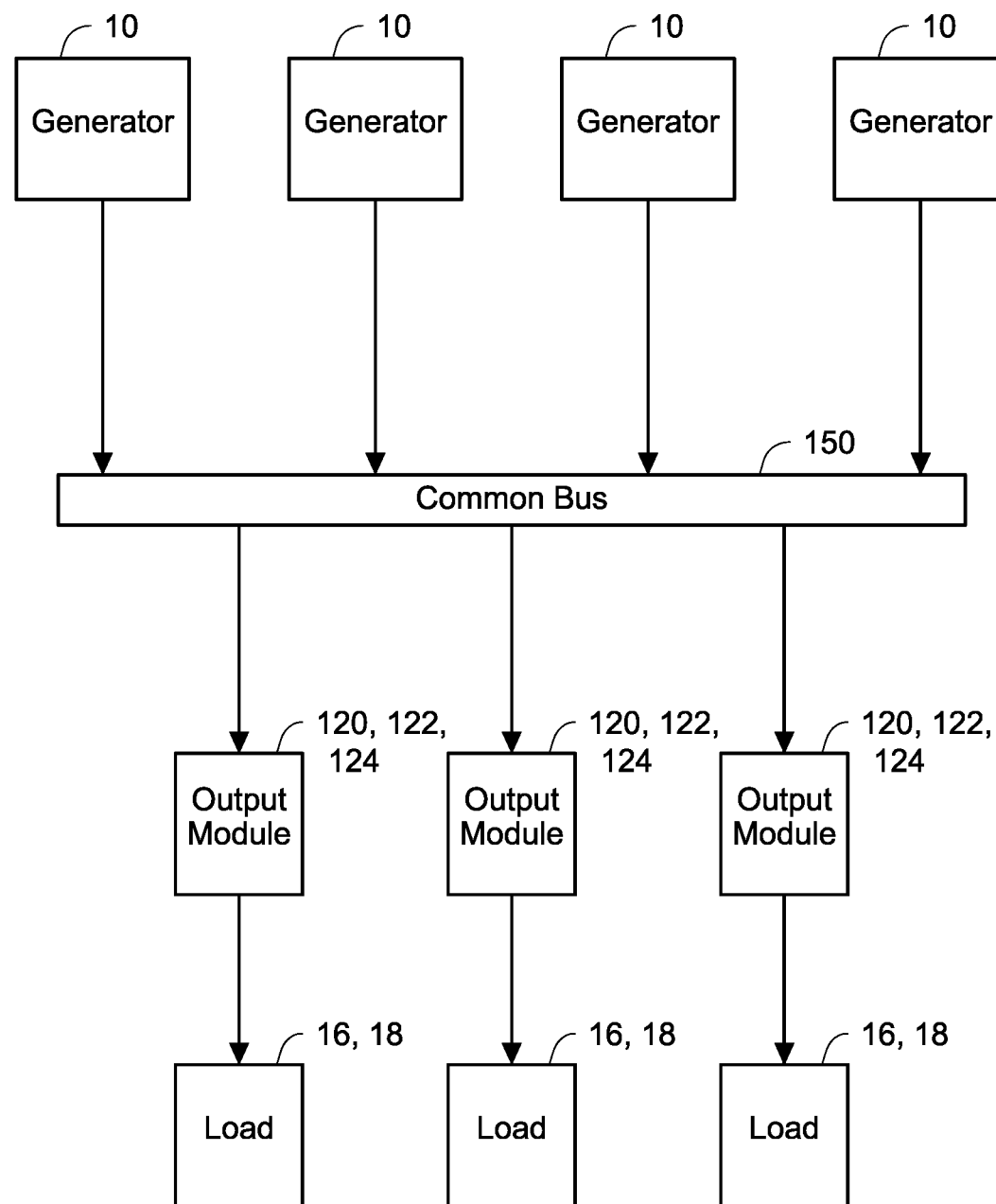

FIG. 15 schematically depicts a common bus connection of the paralleled electrical generators.

Figure 16:
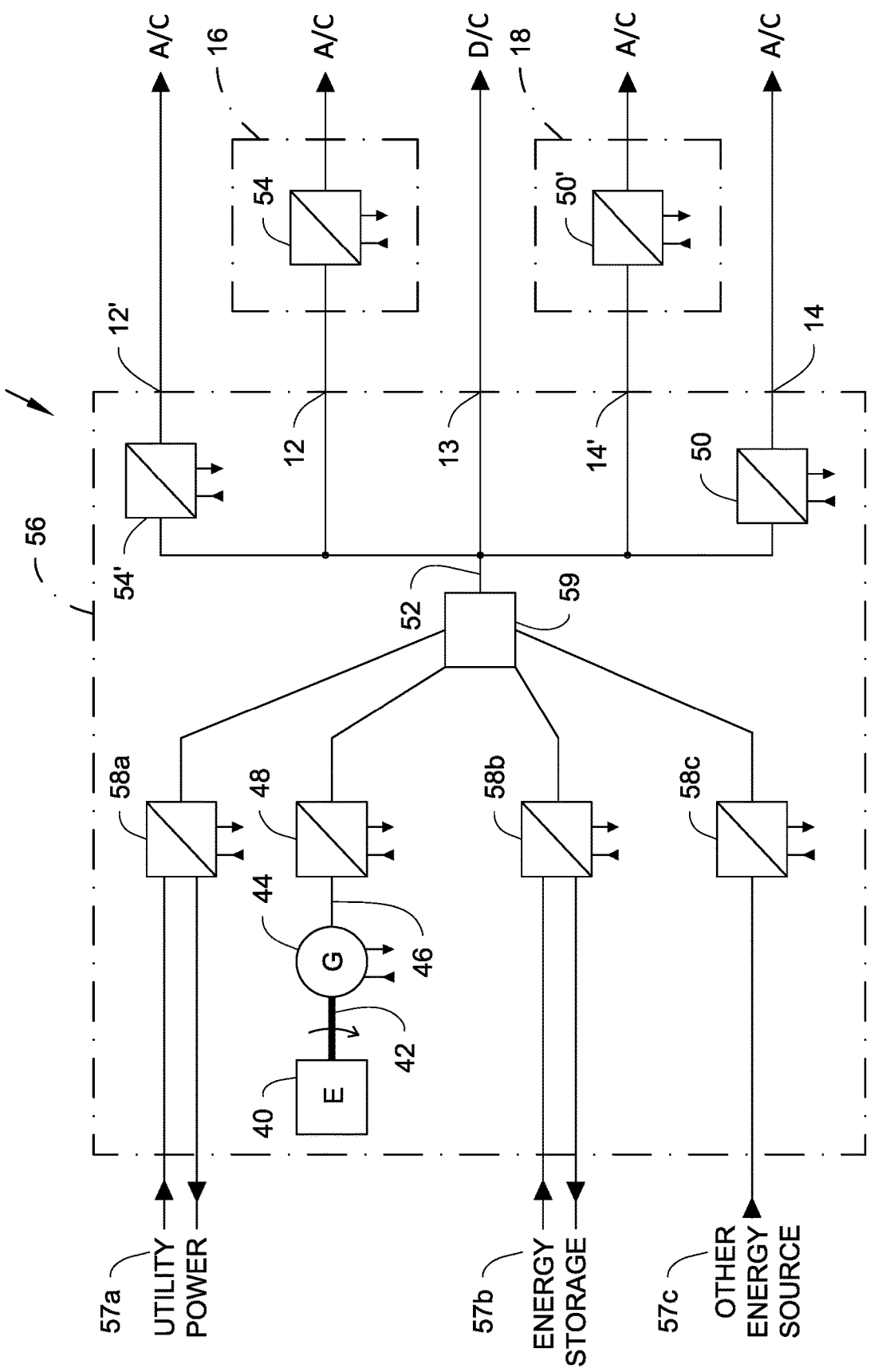

FIG. 16 is a schematic illustration of another embodiment of an electrical system architecture of an electrical generator described herein.

Figure 17:
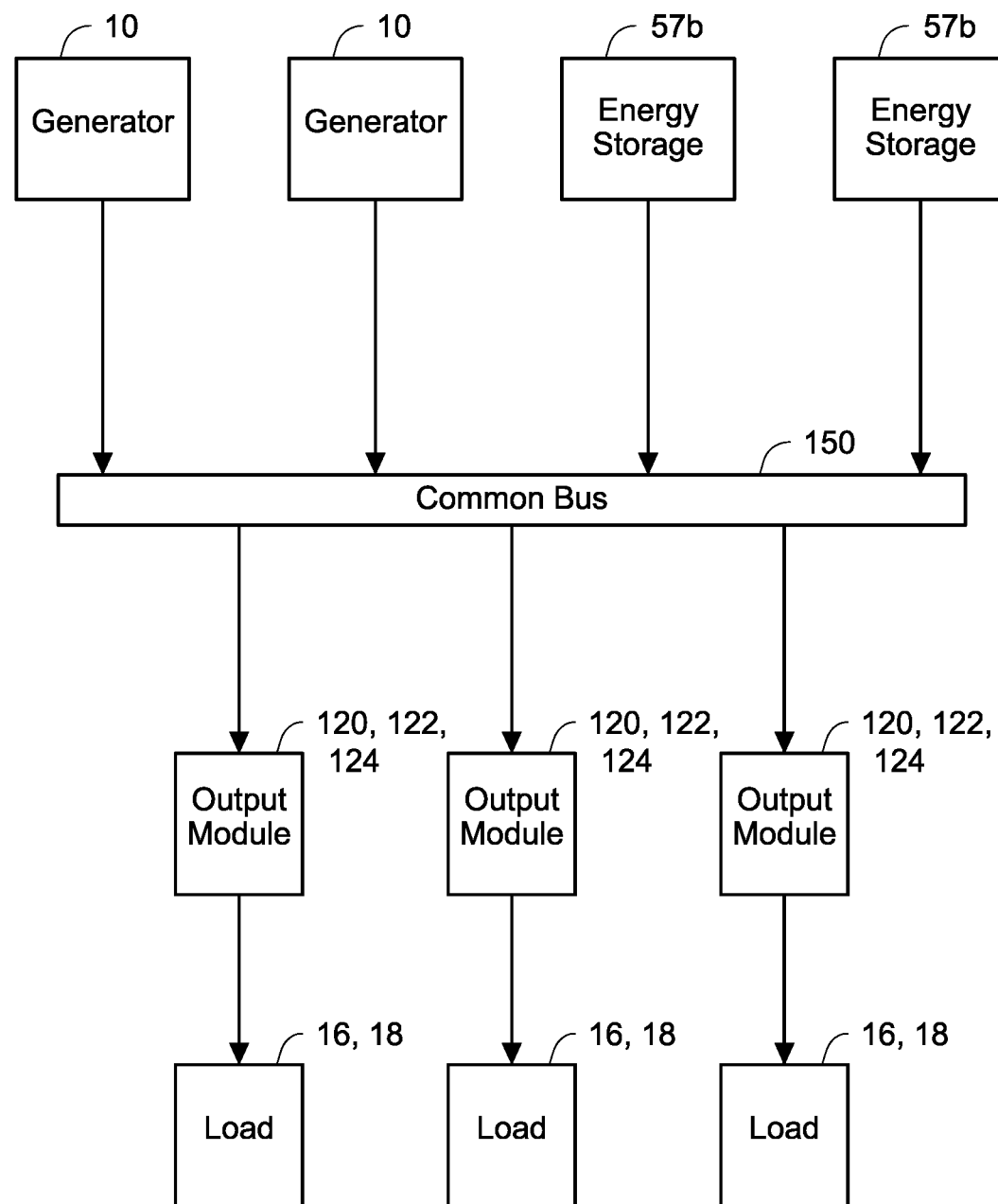

FIG. 17 schematically depicts another example of a common bus connection.

Figure 18:
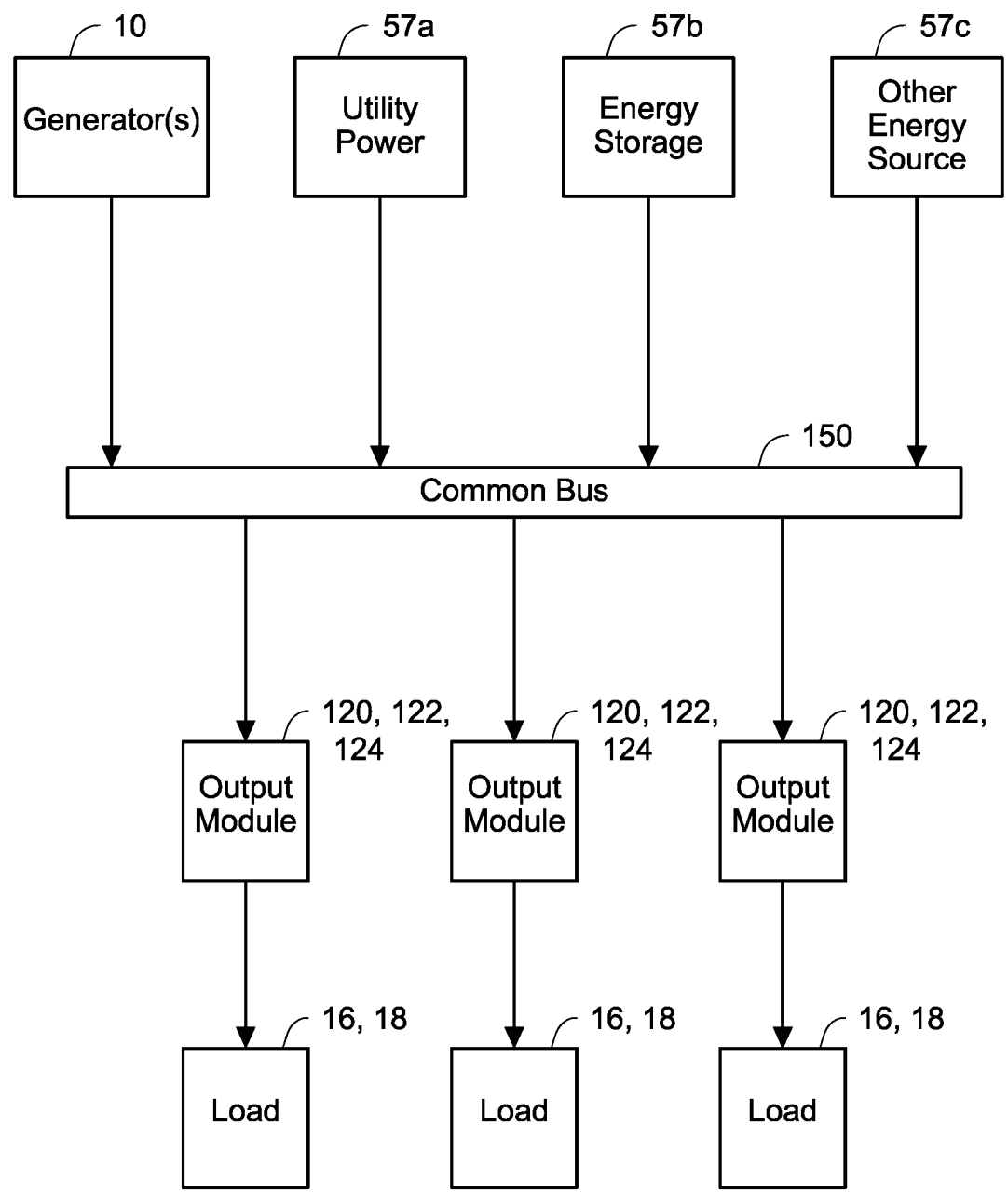

FIG. 18 schematically depicts another example of a common bus connection.

Figure 19:
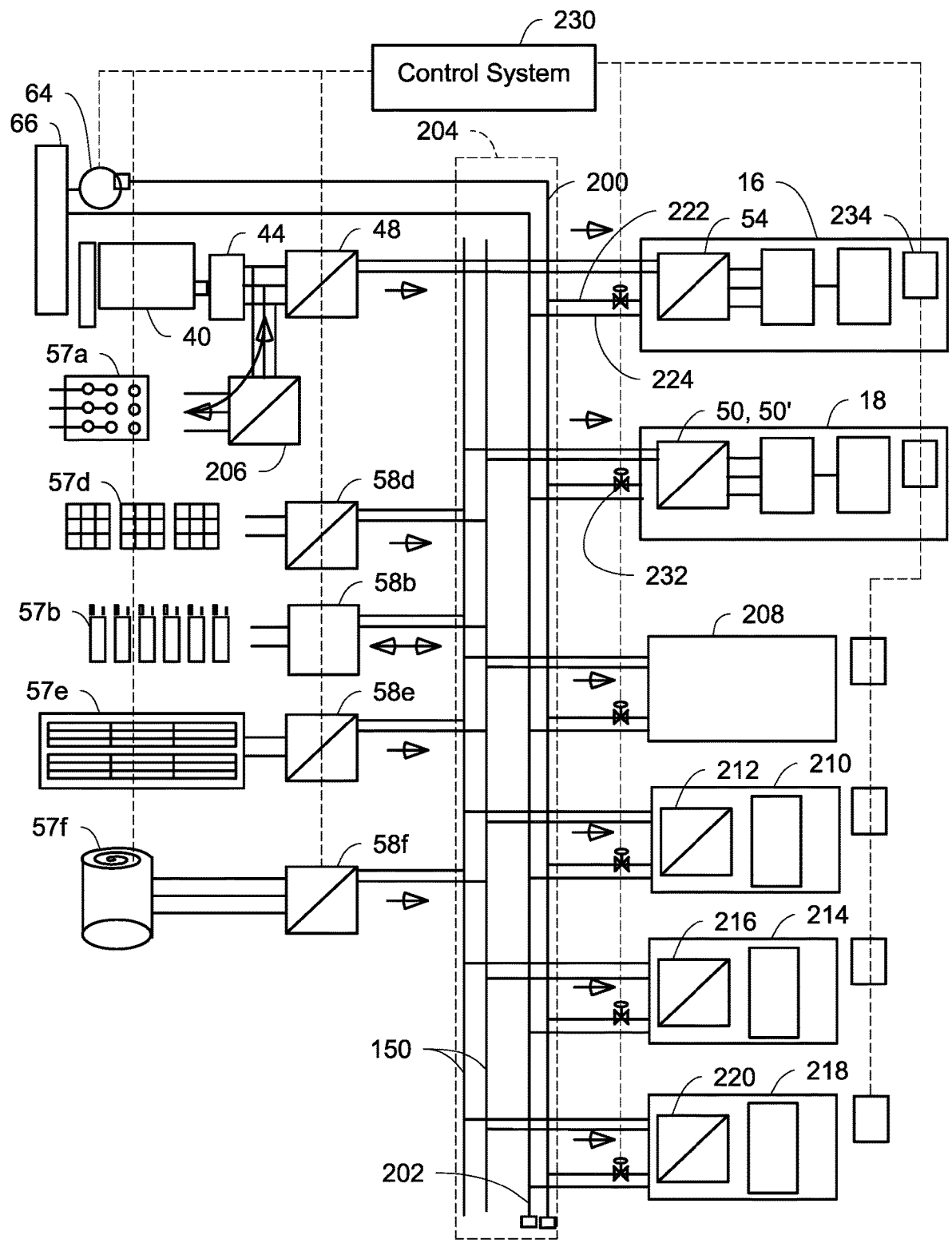

FIG. 19 schematically depicts an example of integrated common bus and thermal control fluid manifolds.

Figure 20:
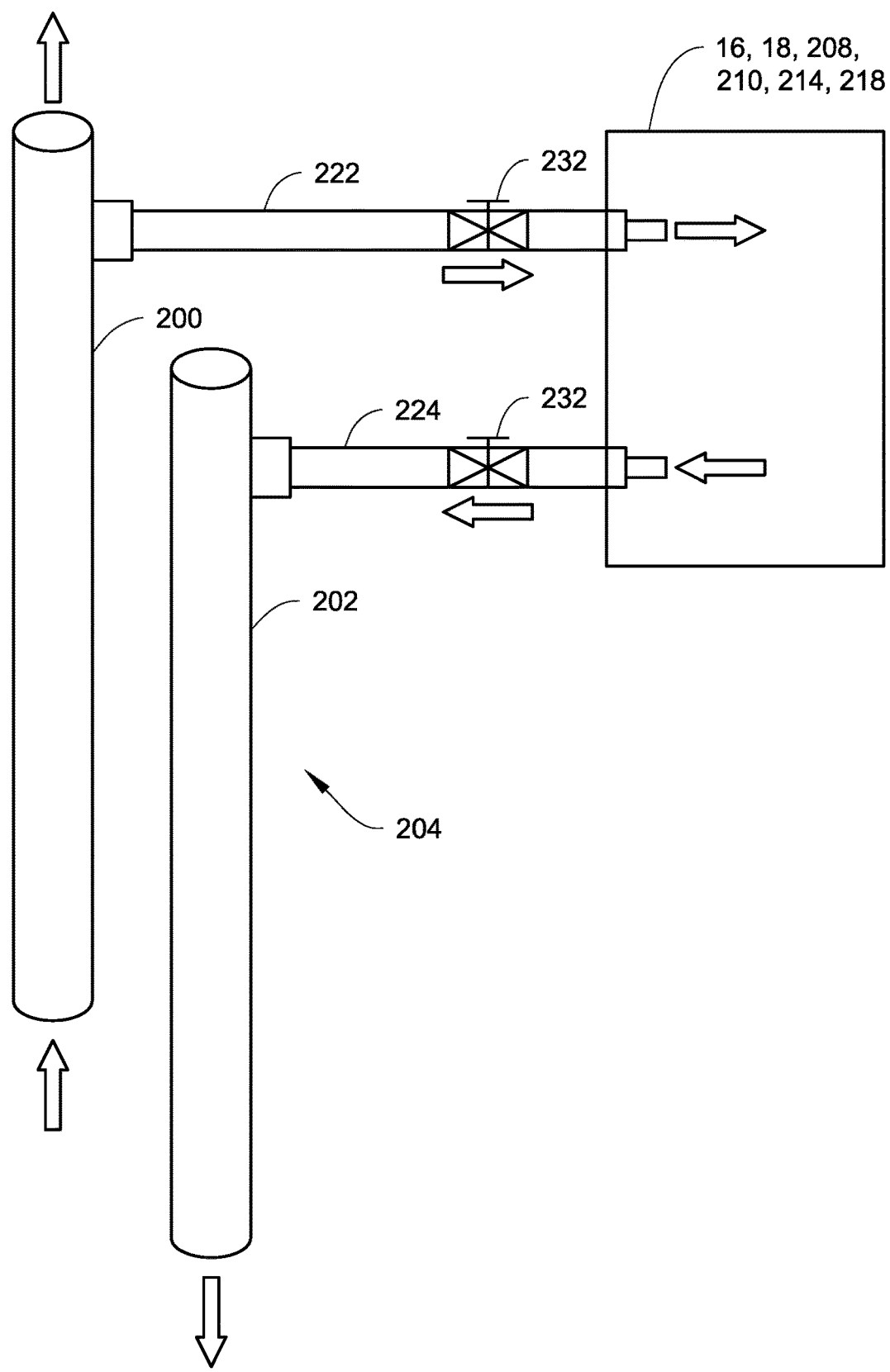

FIG. 20 schematically depicts one example of integrating the common bus and thermal control fluid manifolds.

DETAILED DESCRIPTION

Figure 1:
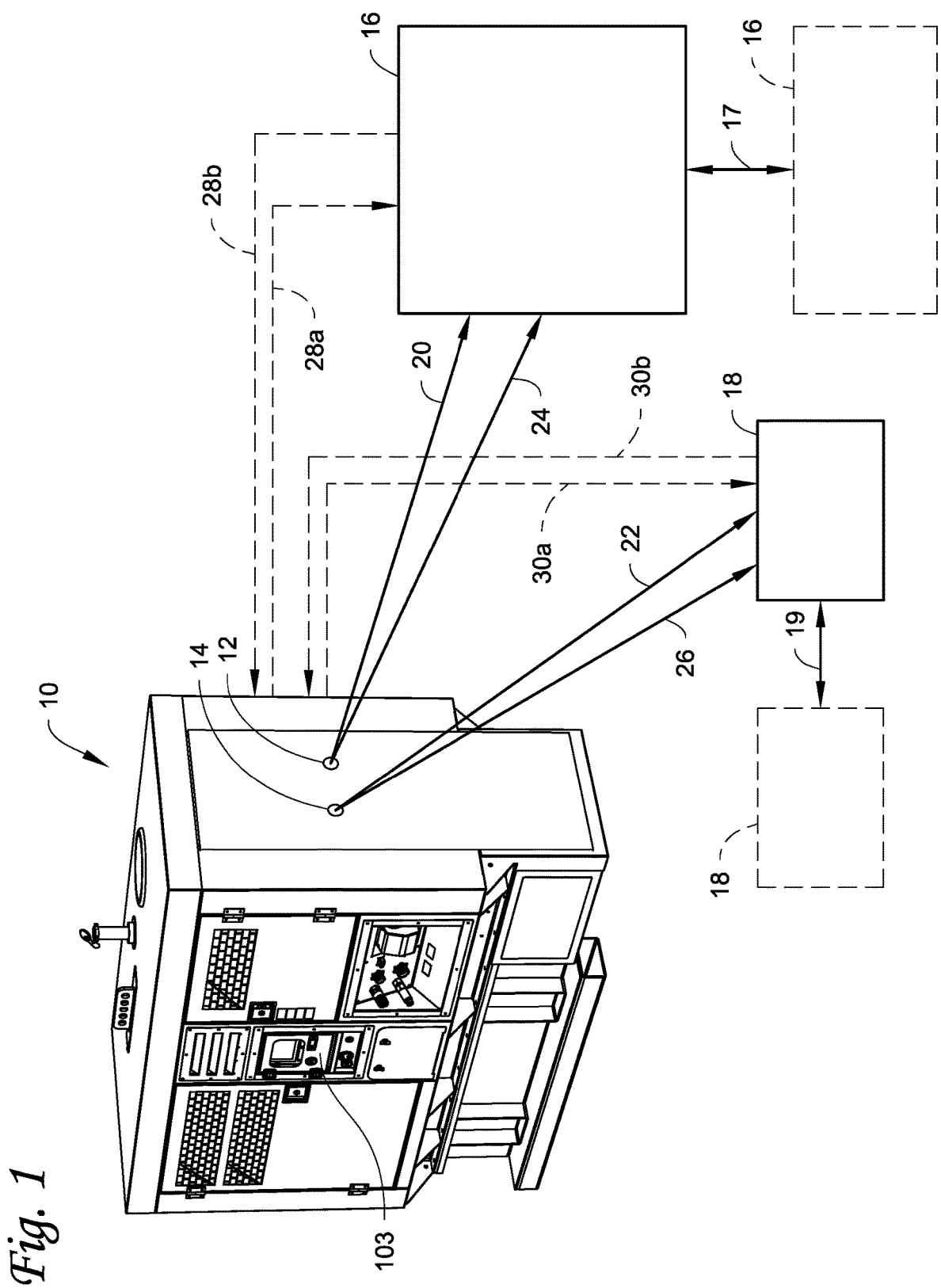
FIG. 1 is a schematic illustration of the electrical generator described herein powering different electrically powered components.

Referring to FIG. 1, an electrical generator 10 as described in more detail below is illustrated. The electrical generator 10 is configured to simultaneously output different types of electrical power from at least two different electrical outputs 12, 14. The electrical output 12 may be considered a first electrical output or a second electrical output, while the electrical output 14 may be considered a second electrical output (if the electrical output 12 is considered the first) or a first electrical output (if the electrical output 12 is considered the second). Different electrically powered components 16, 18 that require different types of electrical power can receive power from the outputs 12, 14 so as to be simultaneously powered by the electrical generator 10. In some embodiments, both of the components 16, 18 need not be powered simultaneously. Instead, the electrical generator 10 can be used to power only the component 16 or only the component 18. The different types of electrical power that can be output from the outputs 12, 14 can include direct current electrical power and an alternating current electrical power, or different forms of alternating current electrical power such as modulated alternating current electrical power (which may also be referred to as a variable frequency and/or variable amplitude power output) and synchronous alternating current electrical power.

In one embodiment, the output 12 can be a direct current output that outputs a direct current (DC) electrical power that is then converted by a power converter externally of the electrical generator 10 into either a modulated, alternating current (AC) electrical power or a synchronous AC electrical power depending upon the electrical power requirements of the component 16. In another embodiment, the output 12 can output a modulated AC electrical power or a synchronous AC electrical power required by the component 16 where the power converter and the conversion into the modulated or synchronous AC electrical power occurs internally of the electrical generator 10. In another embodiment, the output 12 can output DC electrical power that is not converted to AC. In some embodiments, the output 12 may be referred to as a modulated electrical power output that outputs modulated electrical power (which may also be referred to as a variable frequency and/or variable amplitude power output).

Similarly, the output 14 can be a direct current output that outputs DC electrical power that is then converted by a power converter externally of the electrical generator 10 into either a modulated, alternating current (AC) electrical power or a synchronous AC electrical power depending upon the electrical power requirements of the component 18. In another embodiment, the output 14 can output a modulated AC electrical power or a synchronous AC electrical power required by the component 18 where the power converter and the conversion into the modulated or synchronous AC electrical power occurs internally of the electrical generator 10. In another embodiment, the output 14 can output DC electrical power that is not converted to AC. In some embodiments, the output 14 may be referred to as an export electrical power output that outputs an export (or standard or synchronous) AC electrical power required by the component 18.

In some embodiments, the component 16 may be powered by the output 14 and the component 18 may be powered by the output 12.

The component 16 may be electrically connected to the output 12 via a power line 20, while the component 18 may be electrically connected to the output 14 via a power line 22. In addition, a data line 24 can be provided between the component 16 and the electrical generator 10 to transmit various data between the electrical generator 10 and the component 16, while a data line 26 can be provided between the component 18 and the electrical generator 10 to transmit various data between the electrical generator 10 and the component 18. In addition, as discussed in further detail below, in some embodiments thermal control fluid supply and return lines 28a, 28b (depicted in dashed lines) can extend between the electrical generator 10 and the component 16 and/or thermal control fluid supply and return lines 30a, 30b (depicted in dashed lines) can extend between the electrical generator 10 and the component 18.

In addition, one or more additional ones of the components 16 may be connected to one another in series as illustrated (or in parallel) with one or more power, data and/or thermal control fluid lines 17 connecting the components 16. Similarly, one or more additional ones of the components 18 may be connected to one another in series as illustrated (or in parallel) with one or more power, data and/or thermal control fluid lines 19 connecting the components 18.

The electrical generator 10 illustrated in FIG. 1 is useful in locations where different electrically powered components, such as the components 16, 18, are used that have different electrical power requirements. For example, the component 16 may be an electrically powered component or system that experiences variable loads. Examples of the components 16 that can be powered by the electrical generator 10 include, but are not limited to, an electric drive motor of a pit pump used at a horizontal directional drilling site, one or more electrically powered components of a horizontal directional drilling (HDD) rig, a drilling mud cleaning system used with the HDD rig, a tool truck, maintenance trailer, a light plant, a control cab, a building, a portable saw mill, a cement mixing plant, a welder, or a pipe flange facing machine.

The component 18 may be an electrically powered component that requires standard (or clean or synchronous) electrical power which may be referred to as export power. Examples of the components 18 that can be powered by the electrical generator 10 include, but are not limited to, the same components as the components 16 but configured to be run by synchronous power; a heater at an HDD site; an air compressor; and hand tools.

Figure 2:
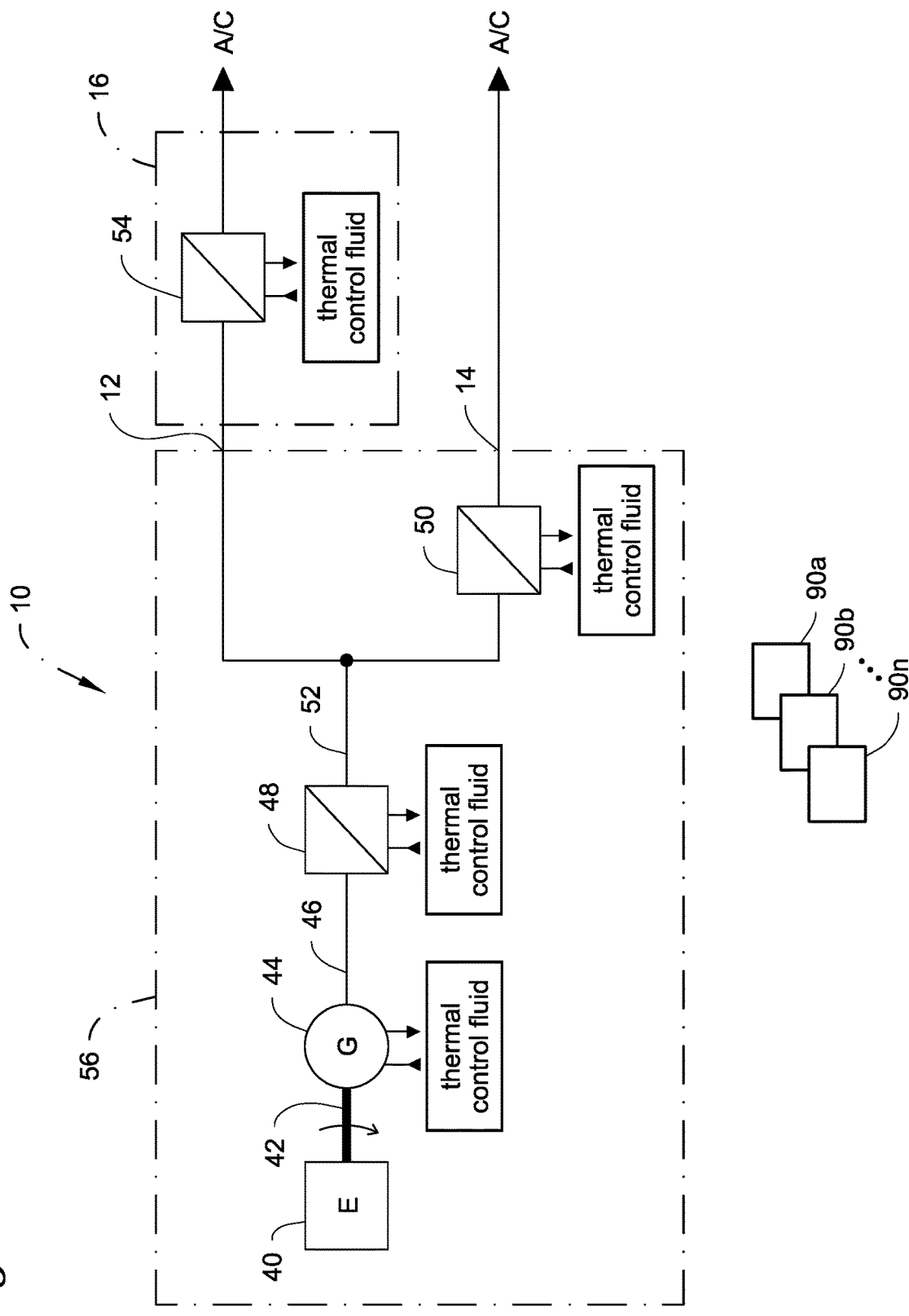
FIG. 2 is a schematic illustration of one embodiment of an electrical system architecture of the electrical generator described herein.

FIG. 2 illustrates one embodiment of an electrical system architecture of the electrical generator 10 that produces different electrical powers at the outputs 12, 14. In this embodiment, the output 12 outputs DC electrical power that is then converted externally of the electrical generator 10 into modulated AC electrical power, while the output 14 outputs synchronous AC electrical power. The electrical generator 10 includes a housing 56 (illustrated in dashed lines) that houses some of the elements described herein. In this example, the electrical generator 10 includes an engine 40, such as a diesel engine, a gasoline powered engine, a propane powered engine, or the like, that outputs mechanical energy via an output shaft 42. The engine 40 can be powered by any suitable engine fuel (wet/dry). Examples of suitable engine fuels that can be used include, but are not limited to, gasoline, diesel fuel, natural gas, propane, and the like.

In addition, conversion components are provided that convert the mechanical energy of the output shaft 42 into the different electrical powers at the outputs 12, 14. The conversion components can be any elements suitable for generating the different electrical powers at the outputs 12, 14. In the illustrated example, the conversion components include an electrical generating element 44, a first power converter 48, and a second power converter 50.

The electrical generating element 44 can be any device that is suitable for converting the torque of the output shaft 42 into an AC output 46, for example single phase or 3-phase AC. In one non-limiting example, the electrical generating element 44 can be a permanent magnet motor that is mechanically connected to and driven by the output shaft 42. The permanent magnet motor can be any permanent magnet motor that is suitable for converting the mechanical input of the shaft 42 into the AC output 46.

The power converter 48 is configured to receive the AC output 46 and convert the AC to DC electrical power that is output along a DC output bus 52. The power converter 48 can have any configuration that is suitable for converting the AC to DC.

In the illustrated example, the DC output bus 52 has at least two branches, with one branch directing DC electrical power to the power converter 50. The power converter 50 converts the DC electrical power into the export, synchronous AC electrical power that is output at the electrical power output 14. In one embodiment, the power converter 50 can be configured to generate 120/240 VAC single phase AC that is output from the output 14. In another embodiment, the power converter 50 can generate 480 VAC 3-phase AC that can be output from the output 14. The power converter 50 can have any configuration that is suitable for converting DC electrical power into the synchronous AC electrical power. An example of the power converter 50 can be a DC to AC inverter.

The other branch of the DC output bus 52 directs the DC electrical power to the output 12. In this embodiment, the electrical component 16 that is electrically connected to the output 12 includes a power converter 54 that is configured to convert the DC electrical power to modulated AC electrical power for use by the electrical component 16. The power converter 54 can have any configuration that is suitable for converting DC electrical power to modulated AC electrical power.

Figure 3:
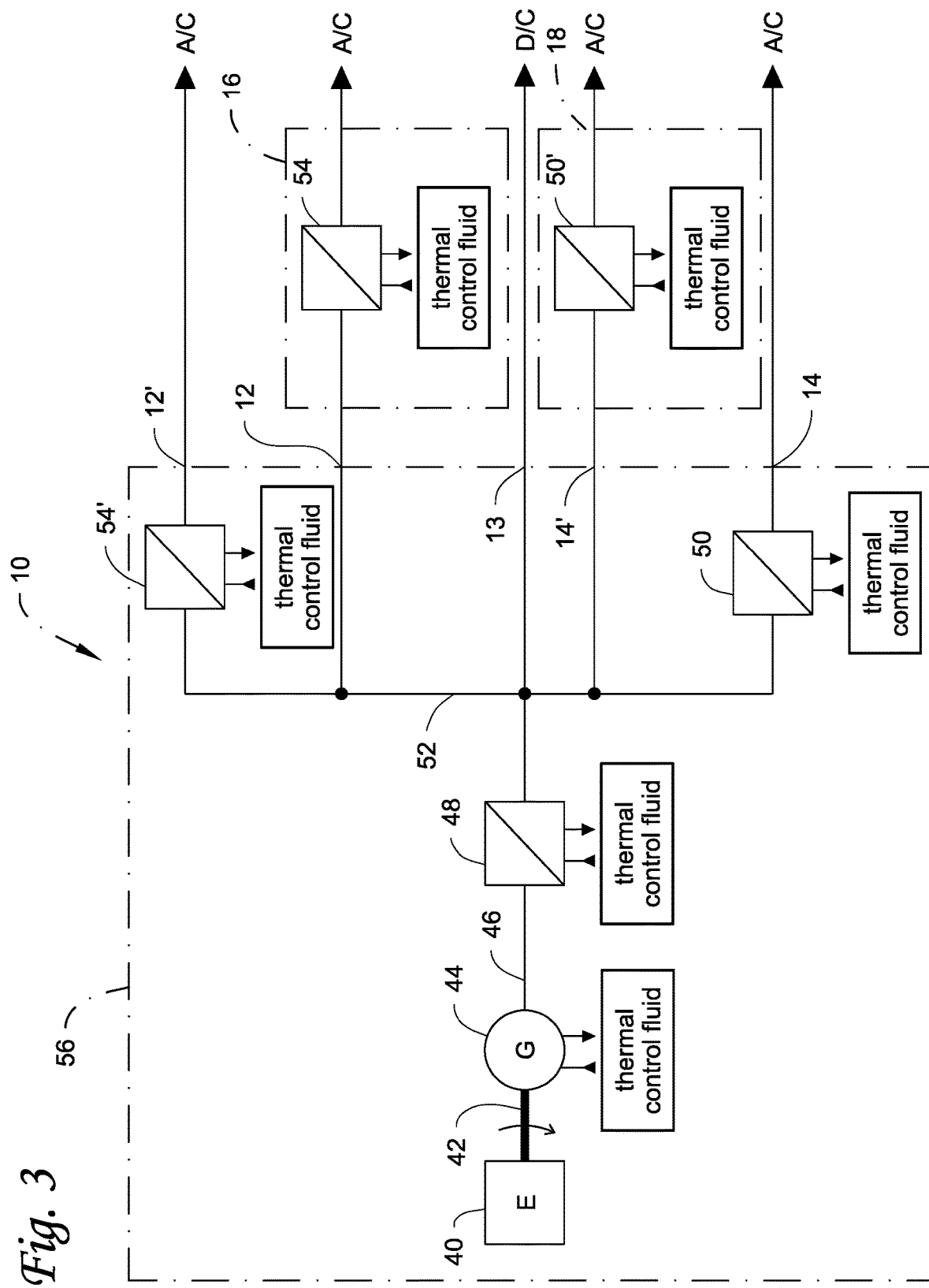
FIG. 3 is a schematic illustration of another embodiment of an electrical system architecture of the electrical generator described herein.

FIG. 3 illustrates another embodiment of an electrical system architecture of the electrical generator 10 that can produce different electrical powers at electrical outputs thereof. Elements that are identical to elements in FIG. 2 are referenced using the same reference numerals. Like the embodiment in FIG. 2, the embodiment in FIG. 3 can output DC electrical power at the output 12 that is then converted externally of the electrical generator 10 by the power converter 54 into modulated AC electrical power, while the output 14 outputs synchronous AC electrical power. Instead of or in addition to the output 12, the embodiment in FIG. 3 can include an internal power converter 54' that can be similar in function and construction to the power converter 54 and that converts the DC electrical power to modulated AC electrical power internally within the electrical generator 10 and then directs the modulated AC electrical power to an output 12' for use by an external electrical component. Further, instead of or in addition to the output 12 and the output 12', the embodiment in FIG. 3 can include an output 13 that outputs DC electrical power for use by an external electrical component requiring DC electrical power. Similarly, instead of or in addition to the output 14, the embodiment in FIG. 3 can include an output 14' that outputs DC electrical power that is then converted externally of the electrical generator 10 by an external power converter 50' into synchronous AC electrical power for use by the external electrical component 18 requiring synchronous AC electrical power.

The embodiment of the electrical generator 10 in FIG. 3 can include any two or more of the outputs 12, 12', 13, 14, 14' in any combination thereof. In one embodiment, the electrical generator 10 in FIG. 3 includes the output 12' and the output 14.

Figure 4:
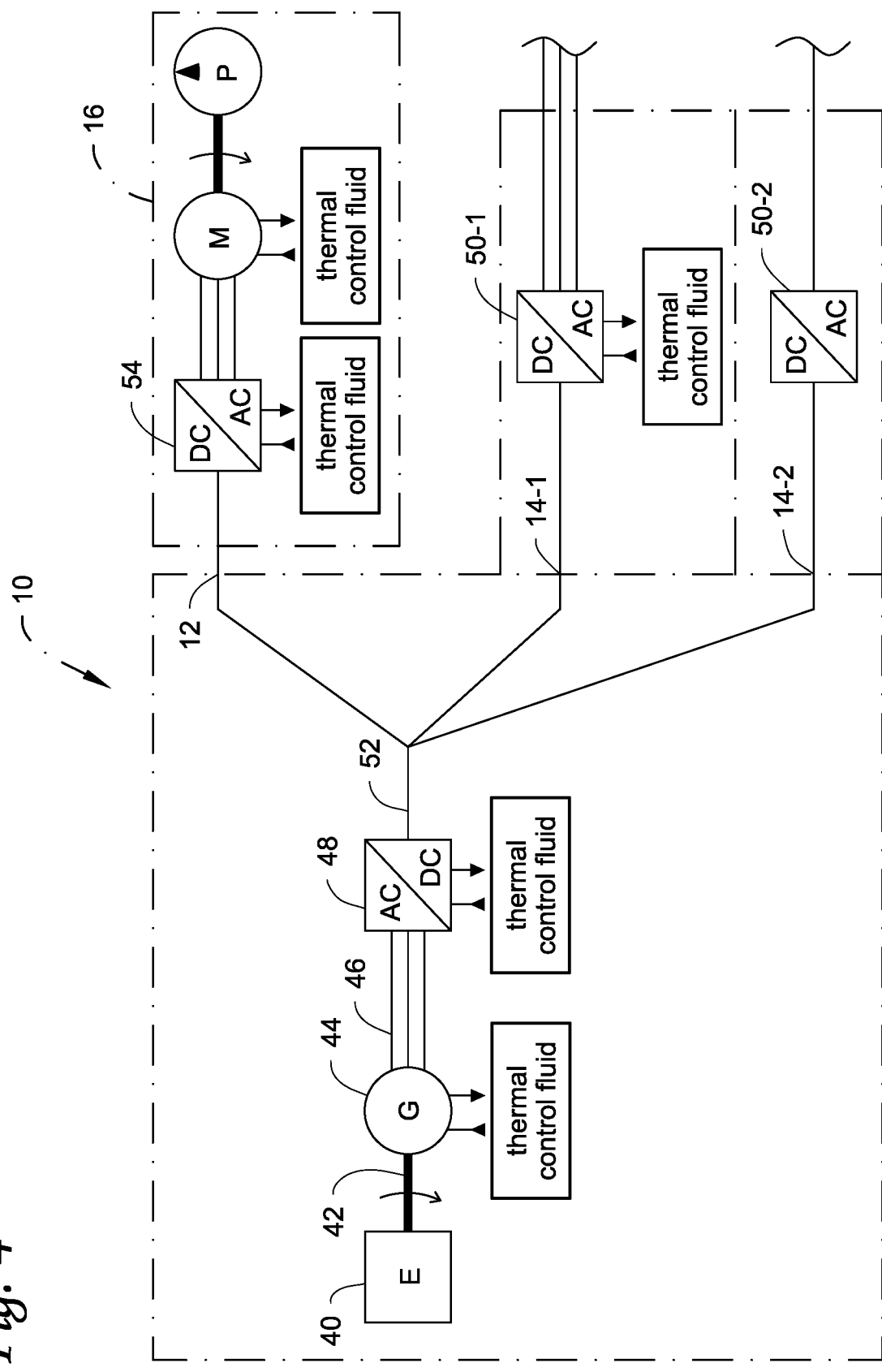
FIG. 4 is a schematic illustration of still another embodiment of an electrical system architecture of the electrical generator described herein.

FIG. 4 illustrates another embodiment of an electrical system architecture of the electrical generator 10 that can produce different electrical powers at different electrical outputs thereof. Elements that are identical to elements in FIGS. 2 and/or 3 are referenced using the same reference numerals, or the same reference numerals with the ending "-1" or "-2". Like the embodiments in FIGS. 2 and 3, the embodiment in FIG. 4 can output DC electrical power at the output 12 that is then converted externally of the electrical generator 10 by the power converter 54 into modulated AC electrical power. Alternatively, similar to the construction depicted in FIG. 3, the electrical generator 10 in FIG. 4 can include an internal power converter 54'. In addition, the electrical generator 10 in FIG. 4 can include two outputs 14-1, 14-2 each of which outputs DC electrical power from the bus 52. Each of the DC electrical powers is then converted by an external power converter 50-1, 50-2, respectively, into synchronous AC electrical power. The power converter 50-1 is configured for high power conversion, while the power converter 50-2 is configured for lower power conversion. High power conversion can include, but is not limited to, generating power of about 50 kW or more. Lower power conversion can include, but is not limited to, generating power of about 1.8 KW (or about 15 amps), or about 3.6 kW (or about 30 amps). The power from the power converter 50-1 can be used to power a device requiring synchronous AC electrical power including, but not limited to, a device with higher power requirements, for example up to about 50 kW or more. The power from the power converter 50-2 can be used to power a device requiring synchronous AC electrical power including, but not limited to, a device with lower power requirements, for example about 1.8 KW (or 15 amps) or about 3.6 kW (or about 30 amps).

In another embodiment, the electrical generator 10 can be connected to one or more alternative power sources that are external to the electrical generator 10. The electrical generator 10 may receive electrical power from these alternative power sources and/or the electrical generator 10 may direct electrical power to these alternative power sources. In this embodiment, the electrical generator 10 may also be referred to as an energy handling system since the electrical generator 10 can handle electrical energy from and/or direct electrical power to multiple electrical power sources, including an internal electrical energy source formed by the engine 40 and the electrical generating element 44 as well as one or more electrical energy sources that are external to the electrical generator 10.

For example, FIG. 16 illustrates an embodiment where elements that are similar to elements in FIG. 3 are referenced using the same reference numerals. FIG. 16 illustrates the electrical generator 10 as being connectable to utility lines 57a external to the generator 10 that provide input AC power; one or more energy storage devices 57b external to the generator 10 such as one or more batteries that provide input DC power; and one or more other electrical energy sources 57c external to the generator that can provide input AC or DC power. A power conversion device 58a receives the AC power from the utility lines 57a and converts the incoming AC to DC. An optional power conversion device 58b may receive DC power from the energy storage device 57b and convert the DC to AC. In addition, a power conversion device 58c receives AC or DC power from the energy source 57c and convert the AC to DC or converts DC to AC.

A switching system 59 is provided that can control the flow of electrical power between the power sources 40, 42, 57a-c and the bus 52. For example, the switching system 59 may be configured so that any one of the power sources can provide electrical power to the bus 52. The switching system 59 may also be configured so that any two or more of the power sources can simultaneously provide electric power to the bus 52. In another embodiment, the switching system 59 may be configured so that electrical power is provided from the bus 52 to one of the power sources. For example, electrical energy generated from the engine 40 can be directed to the utility lines 57a to supply power to the electrical grid or to the energy storage devices 57b. The alternative power sources depicted in FIG. 16 be used with the systems illustrated in FIGS. 2 and 4 as well.

In some embodiments, the electrical generators 10 described herein can also include a thermal control system 60 that can be configured to provide a thermal control fluid for thermal control of a component that is external to the electrical generator 10. For example, the thermal control fluid can be provided to the component 16 and/or to the component 18. In another example, the thermal control fluid can be provided to a component that is not electrically connected to the electrical generator 10. The thermal control system 60 may also be configured to supply the thermal control fluid to one or more components that are internal to the electrical generator 10.

The thermal control fluid can be a liquid, gas, or a mixture of liquid and gas. The thermal control fluid can be a cooling fluid that cools the external/internal component, or a heating fluid that heats the external/internal component. In some embodiments, the system 60 may be configured to export a heated liquid for providing heat, either in addition to the cooling liquid or without the cooling liquid. The heated liquid can be used to, for example, heat one of the components 16, 18, and/or heat a component internal to the electrical generator 10, and/or heat any external component or structure such as a control cab, or used for any other purpose. When the system 60 exports a heated liquid, the system 60 may be referred to as a liquid heating system. The system 60 may be referred to as a thermal control system regardless of whether it exports cooling liquid and/or heated liquid for heating.

Figure 5:
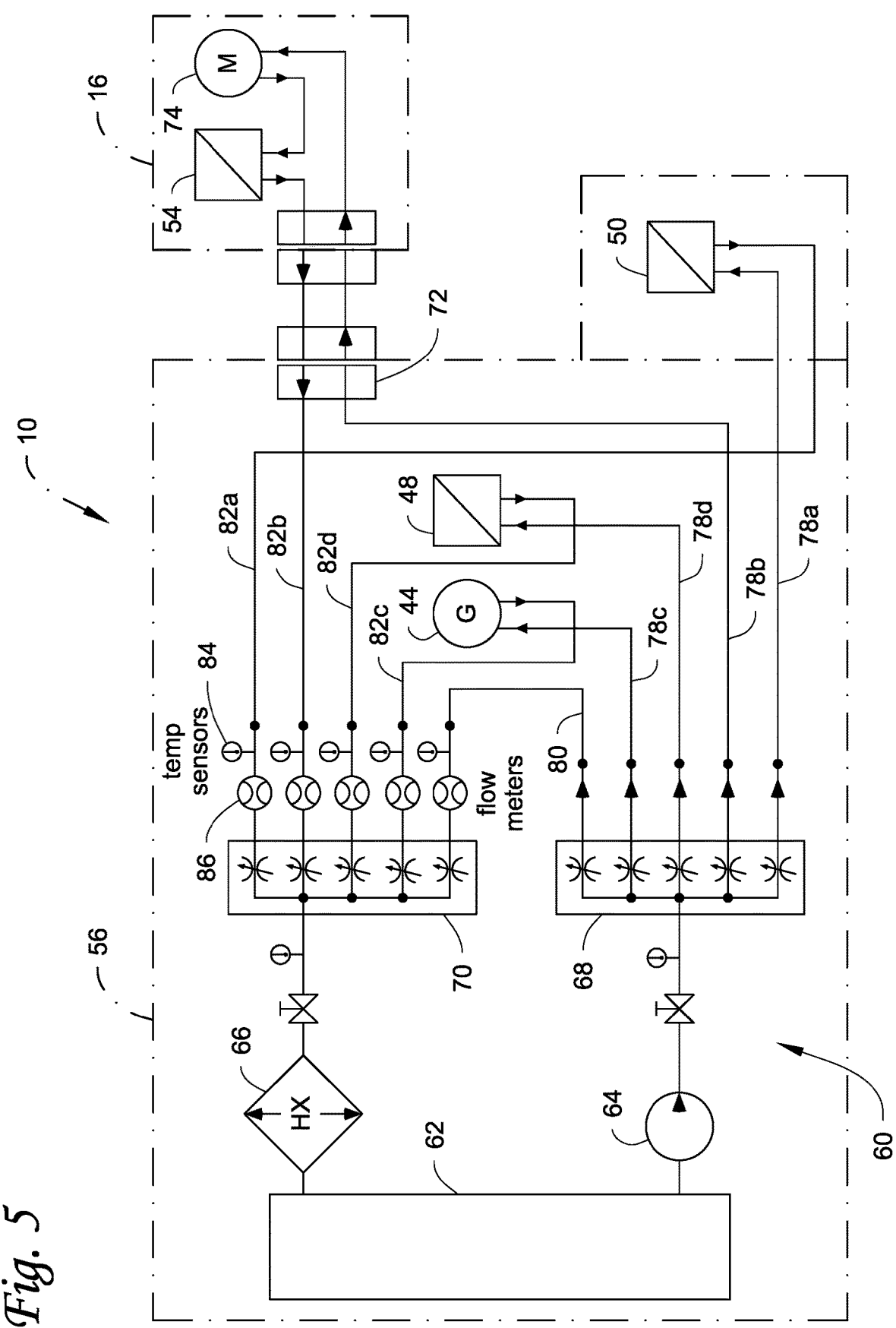
FIG. 5 is a schematic illustration of one embodiment of a thermal control system architecture of the electrical generator described herein.

For sake of convenience, the system 60 will hereinafter be described as a liquid cooling system that provides a cooled liquid as the thermal control fluid. FIG. 5 illustrates one embodiment of the system 60 configured as a liquid cooling system. The liquid cooling system 60 can include a liquid coolant tank 62 that is configured to contain a liquid coolant and act as a supply of the liquid coolant, a coolant pump 64 connected to the liquid coolant tank 62 for pumping the liquid coolant through the cooling system 60, and a heat exchanger (or chiller) 66 for cooling the liquid coolant. In addition, the system 60 includes a coolant supply manifold 68 with a plurality of outlet ports and an inlet receiving coolant from the coolant pump 64, and a coolant return manifold 70 with a plurality of inlet ports and an outlet connected to the heat exchanger/chiller 66. The system 60 further includes at least one externally accessible quick disconnect connector 72 for directing coolant to, and receiving return heated coolant from, at least one external heat generating component, such as the component 16 or a different component, via an umbilical that contains the coolant supply and return lines 28*a*. 28*b* (FIG. 1). In this example, the cooling system 60, such as the tank 62, the pump 64 and the heat exchanger/chiller 66, are disposed within the housing 56.

As described in detail further below with respect to FIG. 14, a thermal control fluid supply bus and a thermal control fluid return bus can be provided on the generator 10. The supply bus and the return bus can be connected to in order to supply thermal control fluid to and return thermal control fluid from one of the modules described below in FIG. 14, one of the electrical components 16, 18, or any external device that is supplied with thermal control fluid from the generator 10.

In embodiments where the thermal control fluid is a liquid coolant, the liquid coolant can be any liquid coolant that is suitable for cooling the heat producing component. For example, the liquid coolant can be water mixed with an anti-freeze agent such as ethylene glycol or propylene glycol, or an oil-based coolant. The tank 62 acts as a reservoir for the liquid coolant to supply coolant and receive returning coolant after performing its cooling function. The pump 64 pumps the coolant through the system 60. The pump 64 can be an electric motor driven pump that is powered using the electrical power created by the generator 10 or mechanically driven via a suitable drive train by the output shaft 42 of the engine 40. The heat exchanger/chiller 66 receives returning coolant from the return manifold 70 and cools the liquid coolant before it is returned into the tank 62. The heat exchanger/chiller 66 can have any configuration that is suitable for cooling the liquid coolant. For example, in the case of a heat exchanger, the heat exchanger can be configured as an air-to-liquid heat exchanger or configured as a liquid-to-liquid heat exchanger. Other arrangements of the pump 64 and the heat exchanger/chiller 66 are possible. For example, the heat exchanger/chiller 66 can be located on the supply path of the coolant, for example between the pump 64 and the supply manifold 68. In another embodiment, the pump 64 can be located on the return path of the coolant, for example between the manifold 70 and the heat exchanger/chiller 66.

The supply manifold 68 supplies the cooling liquid to various destinations in the cooling system 60 via its outlet ports. For example, a supply line 78*a* can extend from one of the outlet ports in the supply manifold 68 to the power converter 50 in order to direct the cooling liquid to the power converter 50 to cool the power converter 50. In addition, a supply line 78*b* can extend from another one of the outlet ports in the supply manifold 68 to an external outlet in the quick disconnect connector 72 (or to a coolant supply bus) to direct the cooling liquid externally of the electrical generator 10. In the illustrated example, the cooling liquid can be directed to both the external power converter 54 and an electric drive motor 74 that drives the component 16 (for example an impeller of a pit pump) for cooling the power converter 54 and the electric drive motor 74. In the illustrated example, the cooling liquid is directed serially through the electric drive motor 74 and the power converter 54, with the cooling liquid first cooling the electric drive motor 74 and then being directed into the power converter 54 to cool the power converter 54 before the cooling liquid is directed back to the electrical generator 10. In another embodiment, the cooling liquid can be directed to the power converter 54 first before being directed to the electric drive motor 74. In still another embodiment, the cooling liquid can be directed to the power converter 54 and the electric drive motor 74 in parallel where separate streams of the cooling liquid are directed to the power converter 54 and the electric drive motor 74. In some embodiments, if the power converter 54 is not present or does not need cooling, the cooling liquid could be supplied just to the electric drive motor 74 to cool the electric drive motor 74. Similarly, in some embodiments, of the electric drive motor 74 does not require cooling or is not present, the cooling liquid can be supplied just to the power converter 54.

With continued reference to FIG. 5, in some embodiments, other internal components of the electrical generator 10, such as the electrical generating element 44 and the power converter 48, may also be configured to be liquid cooled. In such a case, supply lines 78*c*, 78*d* extend from respective outlet ports in the supply manifold 68 to the electrical generating element 44 and the power converter 48. An optional bypass loop 80 may also be provided that extends between the supply manifold 68 and the return manifold 70. The bypass loop 80 helps to increase the cooling capacity of the system 60.

The return manifold 70 receives the returning heated liquid coolant from the various cooling destinations in the cooling system 60. For example, a return line 82*a* extends from the power converter 50 to one of the inlet ports in the return manifold 70, and a return line 82*b* extends from an external inlet in the quick disconnect connector 72 (or from a coolant return bus) to one of the inlet ports in the return manifold 70. Additional return lines 82*c*, 82*d* extend from the electrical generating element 44 and the power converter 48, respectively, to respective inlet ports in the return manifold 70.

Optionally, temperature sensors 84 and flow meters 86 can be provided in the return lines 82*a-d*. The temperature sensors 84 and the flow meters 86 provide data that is useful for providing health monitoring and/or performance optimization of the electrical generator 10 and its components, as well as health monitoring and/or performance optimization of the heat generating component(s) 74. Data from the temperature sensors 84 and the flow meters 86 can be fed to suitable control logic to monitor these parameters. Variations in the individual temperatures and flows of the cooling liquid can indicate problems with the respective elements including, but not limited to, elements 44, 48, 50, 54, 74, etc., and suitable signals can be generated to warn an operator of a problem or potential problem.

Figure 6:
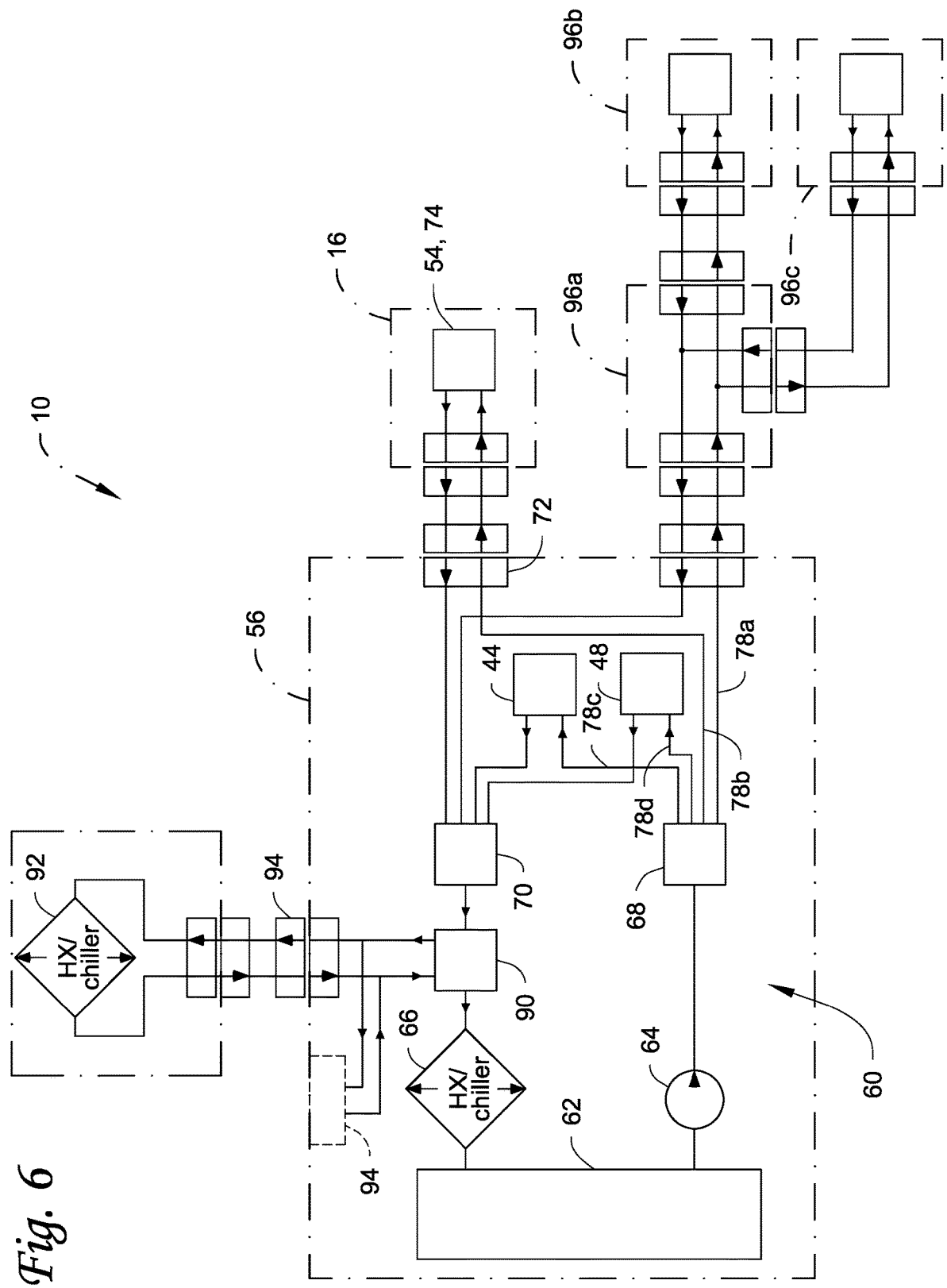
FIG. 6 is a schematic illustration of another embodiment of a thermal control system architecture of the electrical generator described herein.

FIG. 6 is a schematic depiction of a variation of the thermal control system 60 from FIG. 5. In the system 60 in FIG. 6, elements that are the same as elements in FIG. 5 are referenced using the same reference numbers. The system 60 in FIG. 6 is similar to the system 60 in FIG. 5, with the tank 62, the pump 64, the heat exchanger 66, the supply manifold 68, and the return manifold 70 internal to the housing 56.

The system 60 in FIG. 6 differs from FIG. 5 in that a flow selector 90 is provided in the system 60 that can be used to divert the flow of the coolant from the return manifold 70 to an external heat exchanger/chiller 92. The heat exchanger/chiller 92 can be connected to the generator via quick connect connectors 94 or any other suitable form of fluid connector. In this embodiment, the flow selector 90 can be actuated so as to permit flow of the cooling liquid directly from the return manifold 70 to the internal heat exchanger/chiller 66. The flow selector 90 can also be actuated so as to direct flow of the cooling liquid from the return manifold 70 to the external heat exchanger/chiller 92, before flowing back into the generator to the internal heat exchanger/chiller 66. Although the heat exchanger/chiller 92 is depicted as being a stand-alone component, the heat exchanger/chiller 92 can be incorporated into the component 16 and/or into the component 18. In some embodiments, one or more additional quick connect connectors 94 (shown in dashed lines) can be provided for connection with additional external devices.

With continued reference to FIG. 6, external components can also be connected in series and/or parallel to the flow of the cooling liquid for cooling the external components. For example, FIG. 6 illustrates 3 external components 96a, 96b, 96c fluidly connected to and receiving cooling liquid via the supply line 78a. The components 96a, 96b are fluidly connected in series whereby the cooling liquid flows through and cools the component 96a before flowing to and cooling the component 96, and then being returned to the return manifold 70. The component 96c is fluidly connected in parallel with the component 96b, where a portion of the cooling liquid is diverted from the component 96a to the component 96c for cooling the component 96c before being returned to the return manifold 70. In other embodiments, the cooling liquid can be diverted to the components 96b, 96c before flowing into the component 96a.

Figure 7:
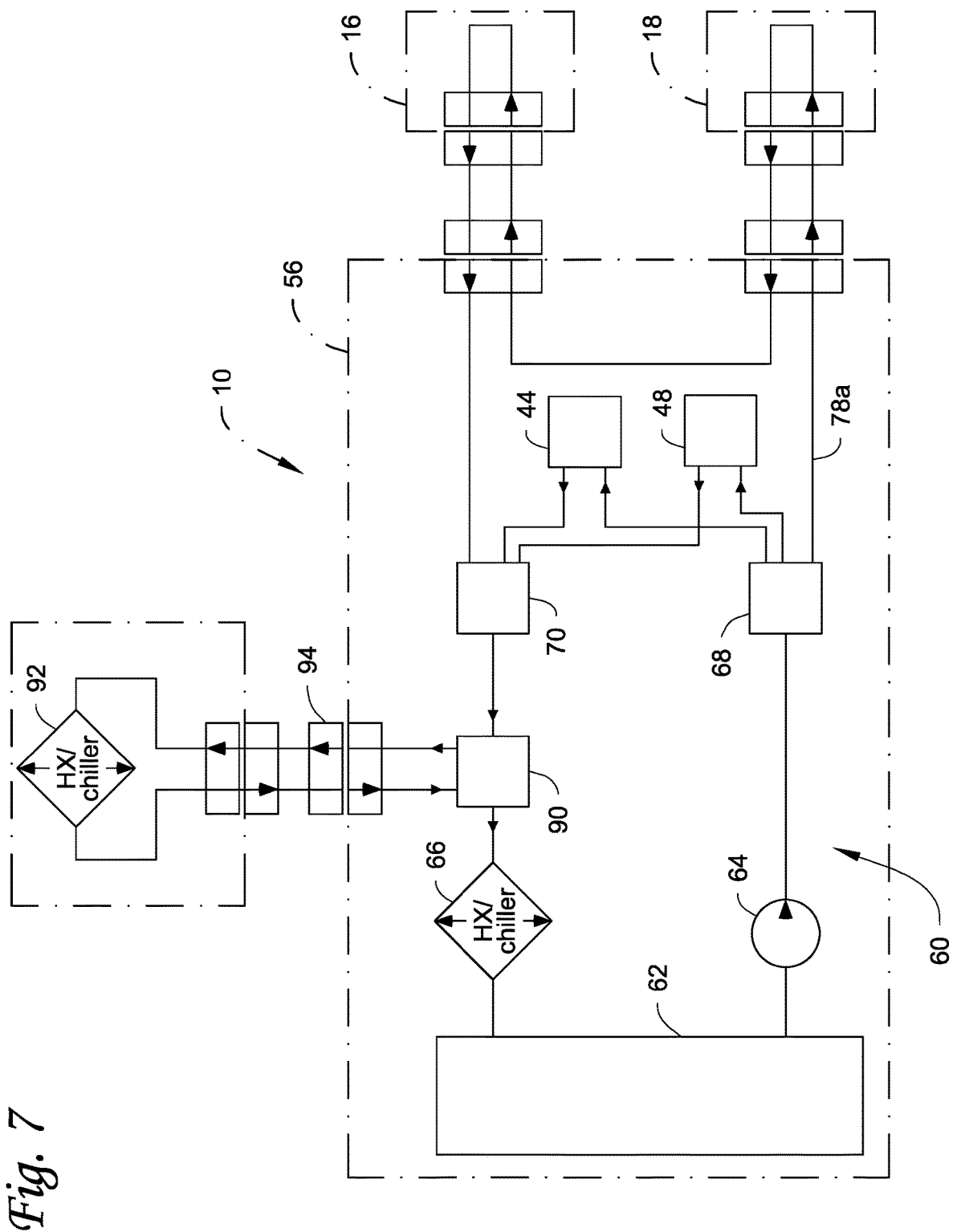
FIG. 7 is a schematic illustration of still another embodiment of a thermal control system architecture of the electrical generator described herein.

FIG. 7 is a schematic depiction of another variation of the thermal control system 60 from FIGS. 5 and 6. In the system 60 in FIG. 7, elements that are the same as elements in FIGS. 5 and 6 are referenced using the same reference numbers. The system 60 in FIG. 7 is similar to the system 60 in FIGS. 5 and 6, with the tank 62, the pump 64, the heat exchanger 66, the supply manifold 68, and the return manifold 70 internal to the housing 56.

The system 60 in FIG. 7 differs from the system in FIG. 6 in that the cooling liquid from the supply line 78a initially flows into a first external component, such as the component 18, to cool the first external component, and the cooling liquid is then directed into and cools the second external component, such as the component 16, before being returned to the return manifold 70. In the embodiment in FIG. 7, the system 60 is configured so that the first and second external components receive the cooling liquid in series. In another embodiment, the first and second external components can receive the cooling liquid in series, with the second external component receiving the cooling liquid first followed by the first external component receiving the cooling liquid before returning to the return manifold 70.

In some embodiments, the electrical generator 10 can include the two outputs 12, 14 without the thermal control system 60 of FIGS. 5-7. In other embodiments, the electrical generator 10 can include only one of the outputs 12, 14 together with the thermal control system 60 of any one of FIGS. 5-7.

Figure 8:
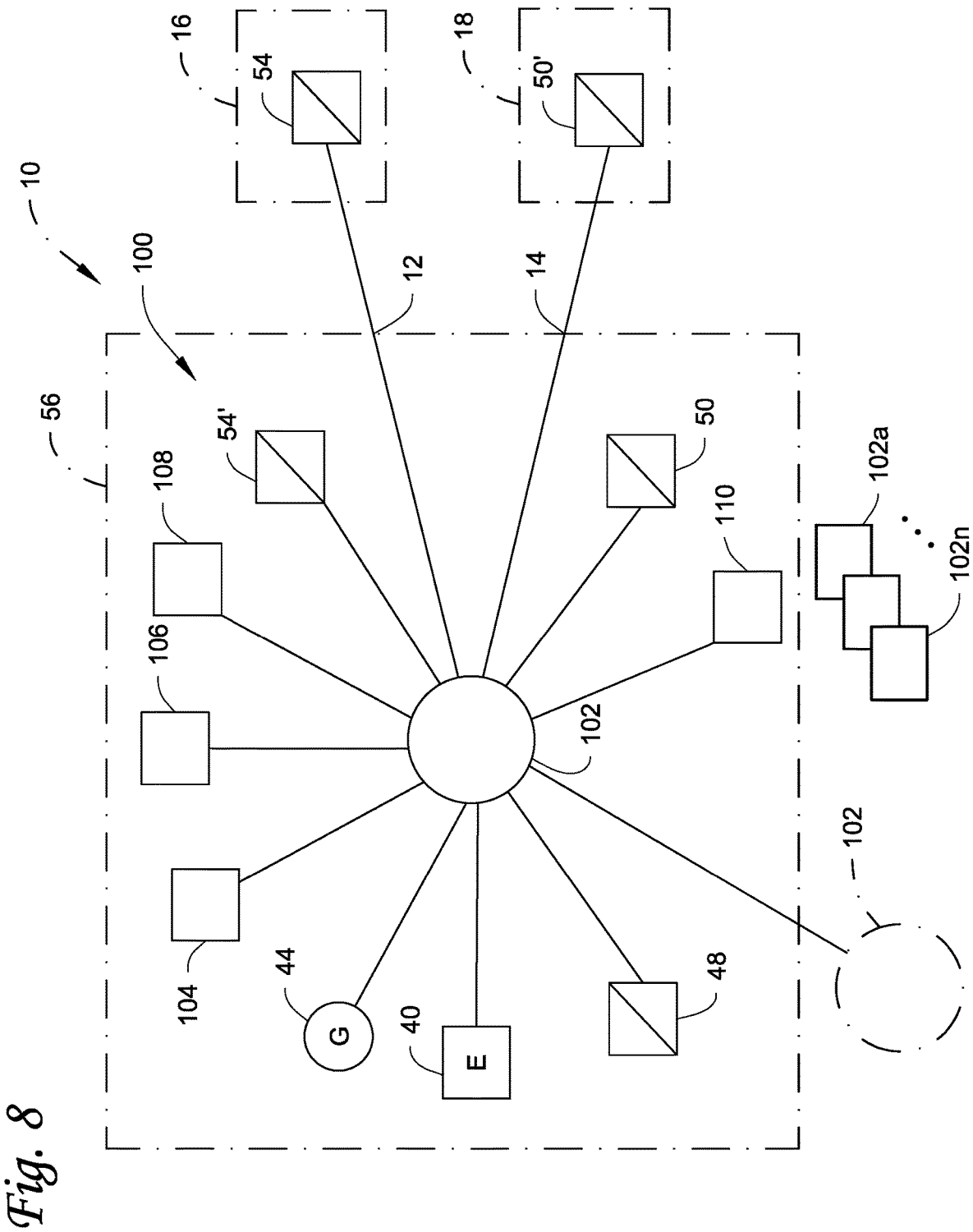
FIG. 8 is a schematic illustration of an embodiment of a control system architecture of the electrical generator described herein.

Referring to FIG. 8, an embodiment of a control system architecture 100 of the electrical generator 10 is illustrated. Elements that are the same as elements in FIGS. 1-7 are referenced using the same reference numbers. A removable and replaceable user interface module 102 is installed on the electrical generator 10 for controlling operation of the electrical generator 10 based on the component 16 that is connected to or to be connected to the modulated electrical output, or optionally based on the component 18 that is connected to or to be connected to the export electrical power output. Instead of being installed on the electrical generator 10, the user interface module 102 can be used remotely from the electrical generator 10 (as indicated in broken line) to control the electrical generator 10.

In some embodiments, the user interface module 102 can be replaced with one of a plurality of additional user interface modules 102a . . . 102n each one of which is specifically configured to be installed on the electrical generator 10 depending upon the external component 16 to be powered by the generator 10. Each user interface module 102, 102a . . . 102n is specifically configured for use with its associated external component 16 to control the electrical generator 10 to ensure that the correct electrical power required by the component 16 is supplied at the modulated electrical output 12. Since each different component 16 that may be connected to the modulated electrical output 12 may require a different modulated electrical power, the modulated electrical power at the modulated electrical output 12 can be different for each user interface module 102, 102a, . . . 102n. The user interface modules 102, 102a, . . . 102n can individually and removably plug into a module mounting location 103 on the electrical generator 10. In other embodiments, instead of adding a new interface module, the programming of the interface module 102 can be changed or added to in order to add a new component 16 so that the interface module 102 can be used with each new component 16 by modifying the programming of the interface module 102 based on each new component 16.

With continued reference to FIG. 8, the control system architecture 100 is also illustrated as including a Bluetooth module 104 that can connect to a smart device, such as a smart phone or tablet, via Bluetooth to receive feedback from the electrical generator 10 and to permit control of the electrical generator 10 by the smart device, a communication modem 106 to permit remote connection to a remote controller, such as a personal computer or the like, to receive feedback from the electrical generator 10 and to permit control of the electrical generator 10 by the remote controller, a slave module 108 that receives sensor signals and outputs all control signals for the electrical generator 10, and an isolation monitor 110 that forms an electrical safety system that monitors electrical isolation between the chassis of the electrical generator 10 and high voltage.

The electrical generator 10 described herein can be used at any location where electrically powered components that require different types of electrical power are utilized. One specific application of the electrical generator 10 will be described with respect to FIG. 9. In this example application, the electrical generator 10 is used at a site where horizontal directional drilling is occurring. In particular, the site includes a horizontal directional drilling (HDD) rig 110 and a pit pump 112. The HDD rig 110 is configured to perform horizontal directional drilling which is well known to those of ordinary skill in the art. The HDD rig 110 can be electrically powered with components such as traverse carrier drive components and drill pipe rotation components driven by electric motors. The HDD rig 110 can also include other electrically powered components such as a chiller system that is part of a cooling fluid circuit that circulates and cools a refrigerant liquid that is circulated through various ones of the electric motors on the HDD rig 110 for cooling the electric motors. An example of an electrically powered HDD rig 110 is disclosed in U.S. Patent Application Publication 2017/0342816, the entire contents of which are incorporated herein by reference.

The pit pump 112 is disposed in a pit 114, submerged in drilling fluid, and is configured to pump the drilling fluid to a recycling system of the HDD rig 110 to be recycled for re-use by the HDD rig 110. The pit pump 112 is part of a drilling fluid recycling system that is used to recycle used drilling fluid for re-use during a borehole drilling operation. Used drilling fluid from the drilling operation, mixed together with solids from the borehole, can collect in the pit 114, which can be an exit pit or an entry pit, with the used drilling fluid mixed with solids then being pumped by the pit pump 112 to the rest of the recycling system where the used drilling fluid is processed to remove the solids and to make the drilling fluid otherwise suitable for pumping back into the borehole. The construction and operation of a drilling fluid recycling system in a HDD system is well known in the art. The pit pump 112 includes an electric drive motor (such as the motor 74 shown in FIG. 5) that drives a pump impeller. A suitable pit pump is available from La Valley Industries of Bemidji, Minnesota.

Figure 9:
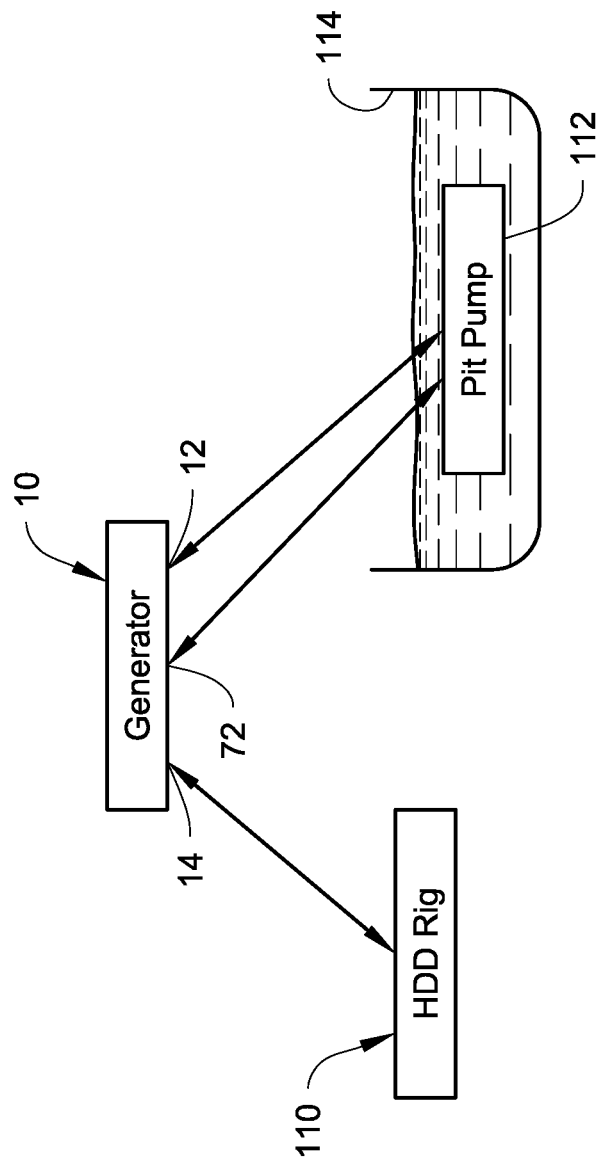
FIG. 9 is a schematic illustration of the electrical generator described herein used at a site where horizontal directional drilling is occurring.

With continued reference to FIG. 9, the drive motor of the pit pump 112 is electrically connected to the output 12 to receive the modulated electrical power for powering the drive motor. At the same time, one or more electrical components on the HDD rig 100 (or other electrical component(s) at the drilling site) can be electrically connected to the output 14 to receive the export electrical power. In addition, with reference to FIGS. 5 and 9, the drive motor of the pit pump 112 may be configured to be liquid cooled, in which case the drive motor is fluidly connected to the quick disconnect connector 72 of the electrical generator 10 to receive cooling fluid or other thermal control fluid from the thermal control system 60 thereof for cooling the drive motor, with the cooling fluid then being recirculated back to the electrical generator 10 for removing heat from the cooling fluid.

With reference to FIGS. 5-7, in one embodiment, the electrical generator 10 can adjust a temperature of the thermal control fluid directed to the external component(s). For example, a fan of the internal heat exchanger/chiller can be turned on/off and/or the thermal control fluid can be directed to the external heat exchanger/chiller 92 to adjust the temperature of the thermal control fluid. The temperature of the thermal control fluid can be determined using suitable temperature sensor(s), for example the temperature sensor 84 in the return line 82b and/or a temperature sensor in the supply line 78b and/or a temperature sensor on the output from the tank 62. When the external component to be thermally controlled is an electric drive motor, such as the electric drive motor of the pit pump 112, adjusting the temperature of the thermal control fluid directed to the drive motor adjusts the performance capacity/efficiency of the electric drive motor, e.g. adjusts the power or revolutions per minute (RPMs) of the electric drive motor because the electric drive motor is more efficient the cooler it is.

In one embodiment of the electrical generator 10 described herein, the RPM's of the engine can be varied based on the load connected to the output 12 in order to maximize the operating fuel efficiency of the engine 40 based on the specific load. In addition, the export electrical power at the output 14 allows the generator 10 to operate traditional synchronous electrical loads at all common voltages including 120 V, 240 V, 480 V, etc. By providing both the modulated electrical power and the export electrical power, either one can be used at full power (i.e. the modulated electrical power can output 100% of the electrical generator 10 power capacity with the export electrical power outputting 0%; or the export electrical power can output 100% of the electrical generator 10 power capacity with the modulated electrical power outputting 0%). In addition, the power can be split between both the modulated electrical power and the export electrical power simultaneously. If the electrical generator 10 has more than two electrical outputs, the power can be split among the various electrical outputs. The power can be split in any ratio. However, the available generator power (i.e. 100% capacity) cannot be exceeded. In one embodiment, power can be prioritized by the control system of the electrical generator 10 to the external component 16, 18 that needs the most power. The prioritization can be manually set or automatically set based on communications from the component(s) 16, 18. For example, when a component 16, 18 is connected to the generator 10, the component 16, 18 can inform the generator 10 of its power requirements and thus of its priority.

In the embodiments described herein, either output type can be selected as a priority. For example, if the modulated electrical power is selected as a priority, the export electrical power will be reduced in proportion to any increase in the modulated electrical power so that the total remains 100%. Likewise, if the export electrical power is selected as a priority, the modulated electrical power will be automatically reduced in proportion to any increase in the export electrical power so that the total remains 100%. For example, with the modulated electrical power selected as a priority, as the modulated electrical power increases toward 100%, the export electrical power will be automatically decreased proportionally toward 0%.

In addition, in the embodiments described herein, a user can also be permitted to select a power ratio limit that will, if needed, automatically limit the modulated electrical power and the export electrical power to the selected ratio. For example, if one selects a ratio of 70%-30% of the modulated electrical power versus the export electrical power, the modulated electrical power would be limited to a maximum of 70% of the total generator capacity if the device(s) using export electrical power is using its allotted 30% limit of the total generator capacity. In this example, if the device(s) using export electrical power is using only 10% (or some other value less than 30%) of the total generator capacity, the modulated electrical power can exceed the 70% limit by a corresponding amount. However, if the device(s) using the export electrical power then increases to 30%, the modulated electrical power would then be reduced to the 70% limit.

The electrical generator 10 also provides fuel savings by the unique system architecture that provides the modulated electrical power which allows the engine 40 to operate at lower RPM's when the load is lower reducing power consumption and un-necessary wear. Health monitoring can also be provided on the components of the electrical generator 10 to provide state of the art feedback of all critical operating parameters such as duty cycle, temperature, peak cycle, vibration, and the like. Each of the components including, but not limited to, the components 16, 18, 40, 44, 48, 50, 50', 54, 54' 62, 64, 66, 68, 70, etc., can be monitored using temperature sensors, and other sensors, which readings can be fed directly to the user interface module 102, or to the slave module 108 and then the user interface module 102. The readings serve to provide health monitoring of the various components of the electrical generator 10 and used with the generator 10.

Figure 10:
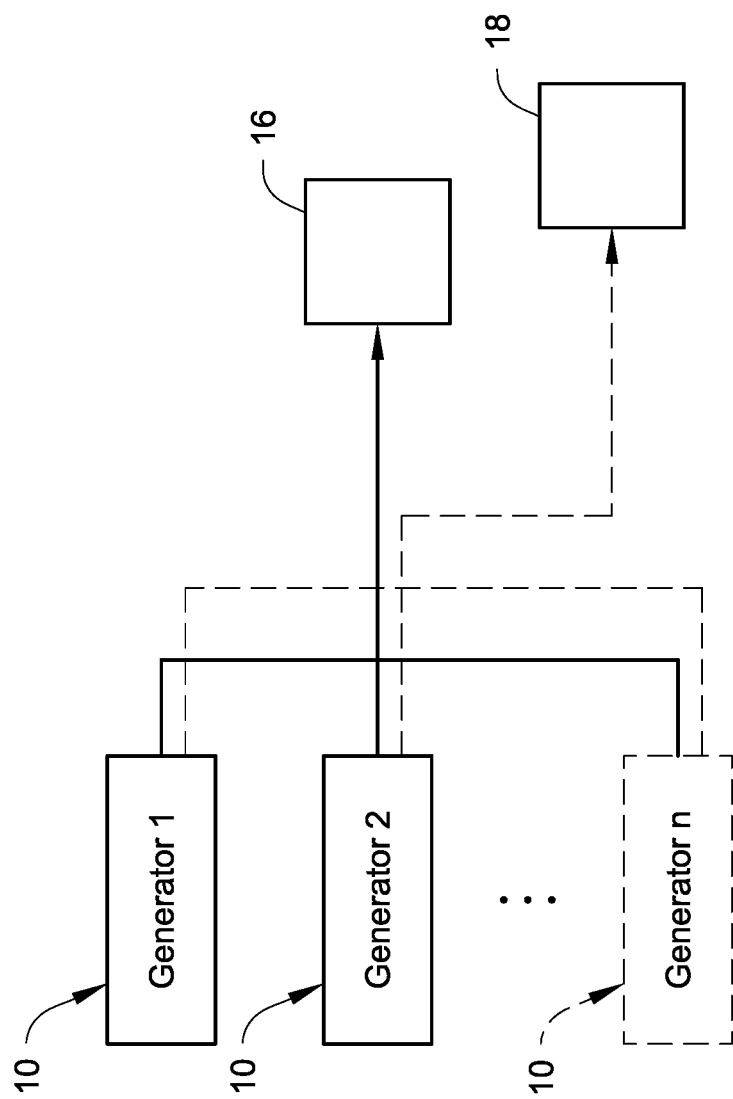
FIG. 10 is a schematic illustration of a plurality of the electrical generators described herein connected in parallel for powering a load.

With reference to FIG. 10, in one embodiment two or more of the electrical generators 10 can be connected in parallel to increase capacity in electrically driving a load, for example driving the component 16 and/or driving the component 18. Further description on paralleling two or more electrical generators is discussed below with respect to FIGS. 14 and 15.

Figure 11:
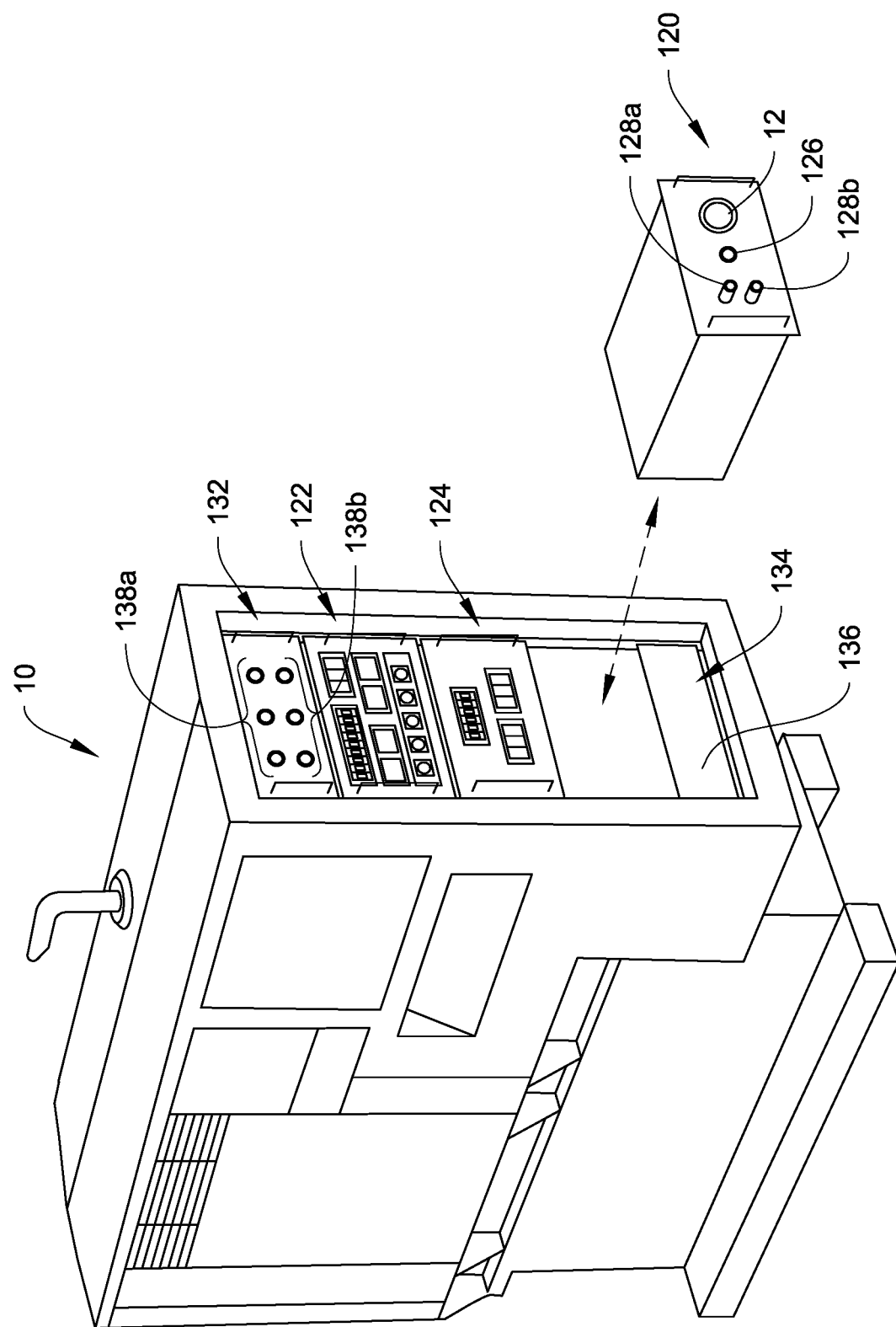
FIG. 11 is a perspective view of another embodiment of an electrical generator described herein where the electrical outputs are incorporated into output modules.
Figure 12:
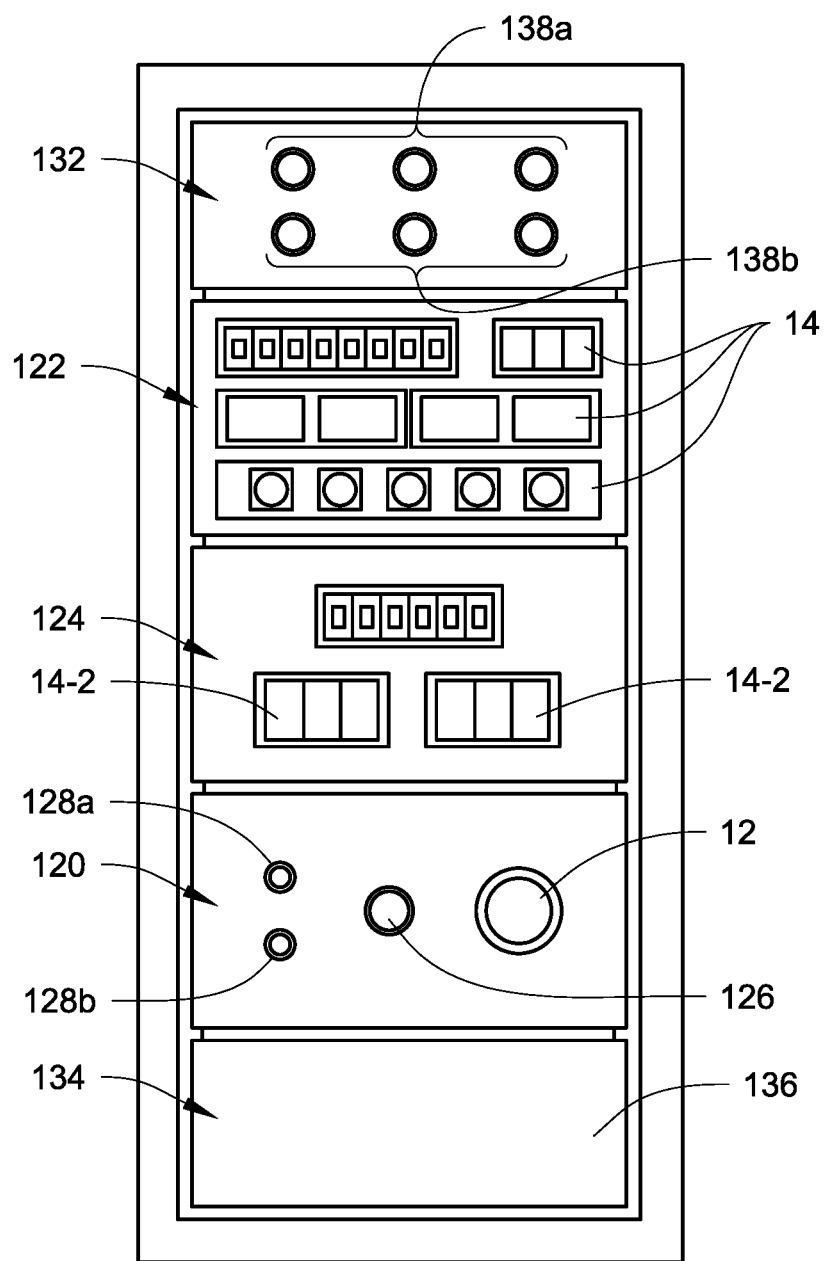
FIG. 12 is a front view of the electrical generator of FIG. 11 with the modules installed.
Figure 13:
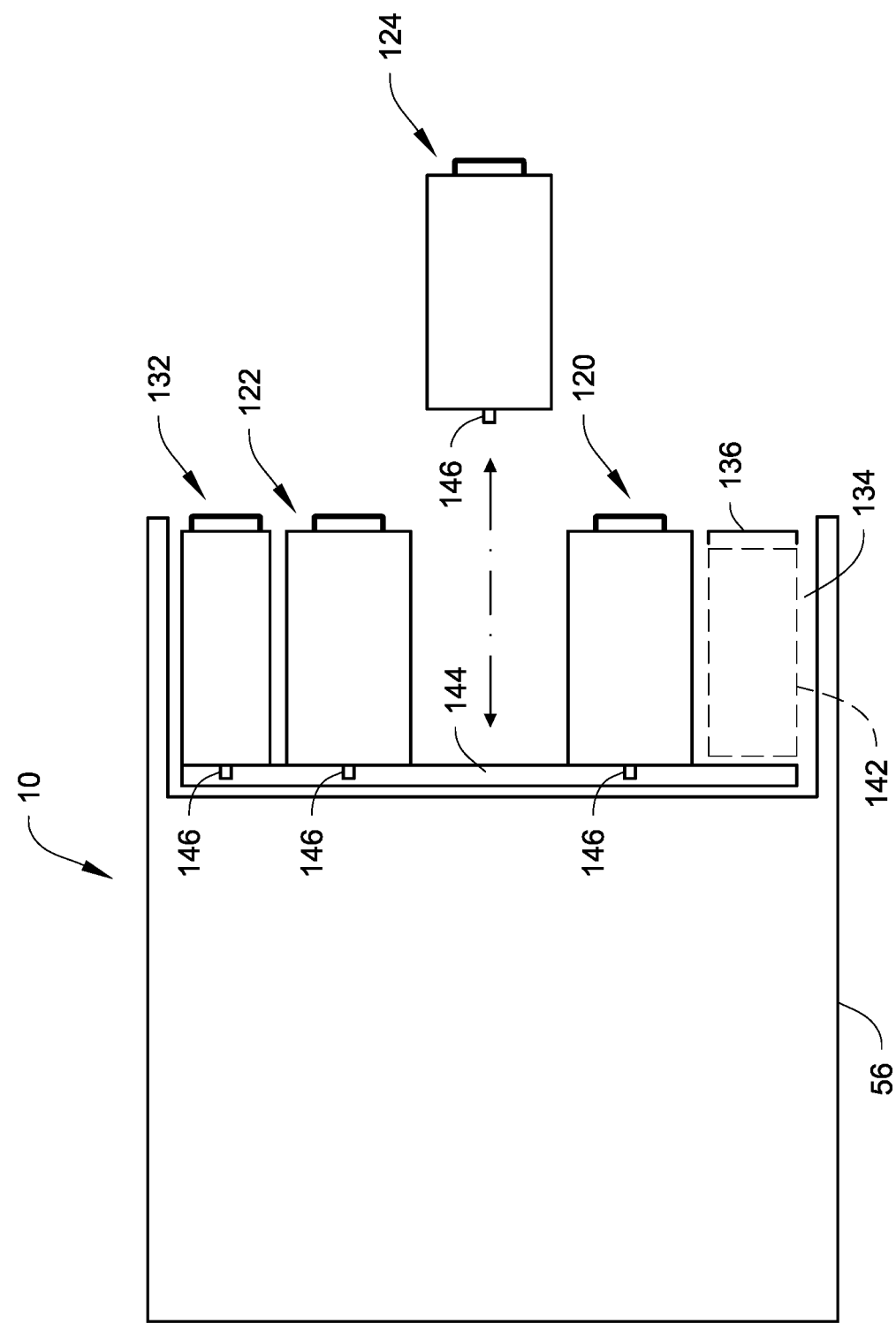
FIG. 13 is a cross-sectional side view of the electrical generator of FIG. 11.

FIGS. 11-13 illustrate another embodiment of the electrical generator 10. In this embodiment, the electrical generator 10 uses a plurality of modules, including output modules that incorporate the different electrical outputs 12, 14. The internal components of the generator 10 in FIGS. 11-13 can be similar to the generator 10 in FIGS. 1-7, including the engine 40 (or other AC input power source), the output shaft 42, the electrical generating element 44, the first power converter 48, and the thermal control system 60. In some embodiments, one or more of the power converters may also be included in the generator of FIGS. 11-13. However, in the embodiment of FIGS. 11-13, the power converters 50, 50', 50-1, 50-2, 54, 54' described herein are preferably included within output modules that are removably installable in the electrical generator 10.

For example, with continued reference to FIGS. 11-13, the generator 10 can include a first power output module 120, a second power output module 122, and optionally a third power output module 124. The first power output module 120 can be configured to output, via the electrical output 12 incorporated into the module 120, the desired form of AC electrical power for powering the component 16. The module 120 includes the power converter 54, 54' that converts the DC power from the DC bus to the desired form of AC electrical power. Similarly, the second power output module 122 can be configured to output, via the electrical output 14 incorporated into the module 122, the desired form of AC electrical power for powering the component 18. The module 122 includes the power converter 50, 50' that converts the DC power from the DC bus to the desired form of AC electrical power. The optional third power output module 124 can be configured to output a lower power from the electrical output 14-2, such as AC electrical power with a lower voltage than the output 14, for example as described above with respect to the output 14-2 of FIG. 4. The module 124 includes the power converter 50-2 that converts the DC power from the DC bus to the desired form of lower power AC electrical power.

The power output modules 120, 122, 124 are each removably installed in the generator 10. As a result, the power output of the generator 10 can be modified by using any combination of the modules 120, 122, 124, and/or replacing one of the modules 120, 122, 124 with a similar module that is configured with a different power converter to change the AC electrical power output therefrom. In some embodiments, a separate module, or one of the power output modules 120, 122, 124, can be configured to output DC power therefrom which DC power is modified from the form obtained from the DC bus. In some embodiments, instead of having a module that modifies the DC power, the DC power from the DC bus need not be modified and unmodified DC power from the DC bus can be output directly from the DC bus including from a power output module.

Each power output module can be configured based on the device intended to be connected to the power output module and/or based on the function of the power output module. For example, if the pit pump 112 of FIG. 9 is to be connected to the generator 10, the power output module to be connected to by the pit pump is configured to output electrical power suitable for the pit pump 112. Similarly, if a component on the HDD rig 110 of FIG. 9 is to be connected to the generator 10, the power output module to be connected to by the HDD rig component is configured to output electrical power suitable for the HDD rig component. The electrical generator 10 may also be used to charge an electric vehicle (EV) in which case a power output module, which may be referred to an EV charging module, is configured to output electrical power suitable for charging the EV. Many other examples of power output modules are possible.

With continued reference to FIGS. 11 and 12, the first power output module 120 can also include a data port 126 for exporting data from and/or inputting data into the module 120. In addition, the module 120 can also include thermal control fluid inlet and outlet ports 128a, 128b that can be used to direct thermal control fluid from the internal thermal control system 60 of the generator 10 to the component 16 receiving power from the module 120. The thermal control fluid from the internal thermal control system 60 can be input into the module 120 via suitable fluid connectors (not shown) on the rear of the module 120 that are fluidly connected to fluid connectors 130 (see FIG. 14) within the generator 10. The fluid connectors 130 can be configured for manual connection, or they can be blind mate, quick connect fluid couplers. The fluid connectors 130 can be part of a thermal control fluid bus assembly formed on each one of the generators 10, with one of the fluid connectors 130 of each pair of fluid connectors 130 connected to a thermal control fluid supply bus that is fluidly connected to the supply manifold 68 (see FIG. 5) and the other one of the fluid connectors 130 of each pair being connected to a thermal control fluid return bus that is fluidly connected to the return manifold 70 (see FIG. 5). The thermal control fluid directed into the module 120 can also be used to thermally control the internal power converter and other heat generating components of the module 120. If desired, thermal control fluid inlet and outlet ports similar to the ports 128a, 128b can also be provided on the modules 122, 124.

Returning to FIGS. 11-13, the generator 10 can also include a paralleling module 132 and at least one module expansion slot 134 covered by a removable cover 136. The paralleling module 132 is configured for interconnecting the generator 10 in parallel with one or more additional ones of the generators 10 as illustrated in FIG. 14. For example, in the illustrated embodiment, the paralleling module 132 is provided with upper, input and lower, output rows 138a, 138b of positive, negative and ground terminals for connecting the generators 10 in parallel using suitable paralleling cables 140 depicted in FIG. 14. Returning to FIGS. 11-13, the module expansion slot 134 is configured to permit the addition of one or more additional modules 142 (depicted in dashed lines in FIG. 13) to the generator 10 when the cover 136 is removed. The additional module 142 can be an additional one of the power output modules 120, 122, 124. In another embodiment, the additional module 142 can be a thermal control module used for thermally controlling the thermal control fluid, for example the thermal control module can include the external heat exchanger/chiller 92 described above with respect to FIGS. 6 and 7. In still another embodiment, the additional module 142 can be used as a thermal control module that acts as a cooling and/or heating module. When configured as a cooling module, the module can act as a source for directing additional flows of the liquid coolant from the internal liquid cooling system 60 of the generator 10 to external devices needing cooling. When configured as a heating module, the module can direct heated coolant externally for heating use, for example to heat a building, a control cab of an HDD rig, or other heating need. The thermal control module can also include a plurality of liquid inlet and outlet ports on the front side thereof permitting connection of fluid lines for directing the cooled liquid coolant to one or more external devices needing cooling or directing the heated coolant to one or more external devices needing heating.

Figure 14:
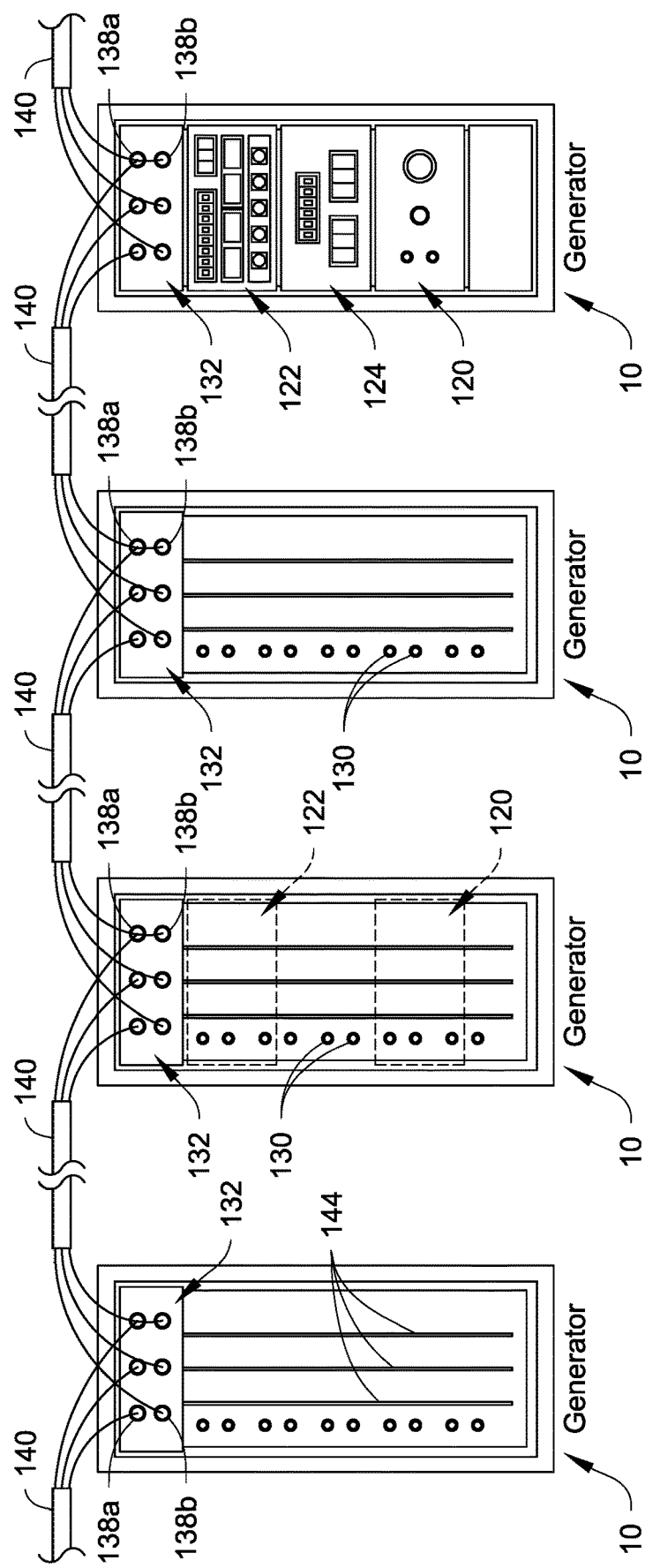
FIG. 14 illustrates a plurality of the electrical generators of FIG. 11 paralleled together.

Referring to FIGS. 13 and 14, electrical power for the modules 120, 122, 124, 132 of the generator 10 can be provided via DC bus bars 144 that form the DC output bus 52 of the generator 10. Each one of the modules is configured to electrically connect to the DC bus bars 144. The modules can electrically connect to the DC bus bars 144 in any suitable manner. For example, as best seen in FIG. 13, the rear side of the each module can include electrical connectors 146 that connect to the DC bus bars 144. The electrical connectors 146 can be blind mate electrical connectors that automatically connect to the DC bus bars 144 when each module is slid into position in its slot in the generator 10, and that automatically disconnect from the DC bus bars 144 when each module is removed from the generator 10. Similarly, the modules 120, 122, 124, 132 can each include blind mate, quick connect fluid couplers that automatically blind mate connect with the blind mate, quick connect fluid couplers 130 when each module is slid into position in its slot in the generator 10, and that automatically disconnect when each module is removed from the generator 10.

FIG. 14 illustrates a plurality of the generators 10 connected to one another in parallel. In the illustrated example, the generator 10 on the right is configured to output electrical power via the output modules 120, 122, 124. The generator 10 on the right is able to supply 100% of the electrical power that is available from all of the generators 10. However, modules can be added to any of the generators 10. For example, the second generator 10 is illustrated as including the output module 120 (in dashed lines) and the output module 122 (in dashed lines). The generators 10 have a common bus connection. The modules can be located in any generator 10 and connect to the common bus while sharing the single common bus power source.

Any generator 10 can be contributing as little or as much electrical power to the bus as needed. Load management control can be used to shed generators 10 or bring generators 10 on as needed without changing connections between the generators 10 since there is a single common bus. In particular, the RPMs of the engines 40 of the paralleled generators 10 can be automatically controlled. For example, in the case of multiple paralleled generators 10, all of the generators 10 may be controlled so as to adjust their RPMs up or down as needed to match the system load. If the system load that is required becomes less than the paralleled generators 10 are producing, then one or more of the generators can be shed (i.e. shut down or its power output not contributing to the total power output of the paralleled generators) as needed. If the system load thereafter increases, then one or more of the generators can be brought back on as needed to contribute to the total power output as.

FIG. 15 illustrates the common DC bus connection of the paralleled electrical generators 10 of FIG. 14. Each generator 10 contributes to the common DC bus 150 of the system, and each output module 120, 122, 124 draws electrical power from the common DC bus 150 for powering its associated load (e.g. components 16, 18). In some embodiments, the bus 150 can be an AC bus.

So the configurations in FIGS. 11-15 permit electrically connecting a plurality of the generators 10 in parallel via a DC bus. In addition, the performance of the generator 10 can be modified by replacing one of the modules, for example one of the power output modules 120, 122, 124, with another module that is configured to have different performance, for example outputting a different amount or type of AC power or DC power in the case of the power output modules 120, 122, 124.

FIG. 17 illustrates another example of a common bus connection. Elements in FIG. 17 that are the same as elements in FIG. 15 are referenced using the same reference numerals. In FIG. 17, a plurality of the electrical generators 10 are depicted as being connected in parallel. In addition, one or more energy storage devices, which can be similar to the energy storage device 57b of FIG. 16, may also be connected to the bus 150. The energy storage device(s) 57b can be part of or separate from the electrical generator(s) 10 and can be used to store electrical energy generated by the electrical generator(s) 10. The energy storage device(s) 57b can be any energy storage device that can store electrical energy. For example, the energy storage device(s) 57b can be one or more batteries, capacitors, and the like. The energy storage device(s) 57b may also be used to provide electrical power for use by the output modules 120, 122, 124, or the energy storage device(s) 57b can be used to provide electrical power for any device external to the electrical generator(s) 10. When the energy storage device(s) 57b is provided, a power output module 120, 122, 124 that is configured for use in outputting electrical energy from the energy storage device(s) 57b and/or controlling charging of the energy storage device(s) 57b can be provided.

FIG. 18 illustrates another example of a common bus connection. Elements in FIG. 18 that are the same as elements in FIGS. 15 and 17 are referenced using the same reference numerals. FIG. 18 depicts one or more of the electrical generators 10 connected to the bus 150 along with the utility lines 57a, one or more of the energy storage devices 57b, and the other energy source 57c. Referring to FIGS. 16 and 18, the generator 10 acts as an energy handling system, where the electrical bus 150 is electrically connectable to a first source of electrical power within the housing 56 or enclosure, and is also electrically connectable to a second source of electrical power external to the enclosure, such as the utility lines 57a, the energy storage 57b and/or the other energy source 57c. In addition, a plurality of electrical power outputs can be provided, for example via the output modules 120, 122, 124, where the power outputs can be connected to in order to direct electrical power to the external loads 16, 18 that are external to the housing/ enclosure. In some embodiments, the bus 150 can receive electrical power from the second, external source of electrical power and the bus 15 can also be used to direct electrical power to the second, external source of electrical power, for example to direct excess electrical power to the electrical grid via the utility lines 57a and/or to charge the energy storage device(s) 57b.

FIG. 19 illustrates another embodiment where the bus 150, and a supply manifold 200 and a return manifold 202 for the thermal control fluid are integrated together in a common assembly 204 (illustrated schematically by the dashed line box). In FIG. 19, elements that are identical or similar to elements previously described above are referenced using the same reference numerals. The common assembly 204 forms a common structure where both electrical energy transfer and thermal energy transfers take place. The common assembly 204 can be integrated into the electrical generator structures described herein. In another embodiment, the common assembly 204 can be a structure that is physically separate from the electrical generator structures described herein, but which can be interfaced with the electrical generator structures described herein.

Different sources of electrical power can electrically connect to the bus 150 of the common assembly 204 to direct electrical power into the bus 150 and/or to receive electrical power via the bus 150. The sources of electrical power can include, but are not limited to, the engine 40 and the generator 44, the utility lines 57a, the energy storage devices 57b, a solar panel array 57d, a fuel cell 57e, or a microturbine 57f. Power conversion devices 58d, 58c, 58f are connected to the array 57d, the fuel cell 57e and the microturbine 57f, respectively, to convert and/or condition the electrical energy in a manner making it suitable for input to the bus 150. FIG. 19 depicts the utility lines 57a feeding electrical power to and/or receiving electrical power from the power conversion device 48 via a transfer switch 206. However, the utility lines 57a can have their own power conversion device, like the power conversion device 58a in FIG. 16.

With continued reference to FIG. 19, different power consuming components can be electrically connected to the assembly 204 to receive electrical power from the bus 150 and/or to receive thermal control fluid from the supply manifold 200. The power consuming components can be any components that can be powered by electrical power received from the assembly 204 and/or that can receive thermal control fluid from the assembly 204 for use in thermal control of the power consuming component. For example, the components can be the components 16, 18, a component 208 that can be directly powered from DC (or AC) power of the bus 150 (i.e. without requiring a power converter), a DC powered component 210 that has a DC/DC power converter 212, an AC higher powered component 214 that has a DC/AC power converter 216 providing higher AC power, and an AC lower powered component 218 that has a DC/AC power converter 220 providing lower AC power (i.e. lower than the DC/AC power converter 216).

One or more of the power consuming components in FIG. 19 can also be fluidly connected to the supply manifold 200 and the return manifold 202 for directing thermal control fluid to and from the power consuming component(s) for performing thermal control of components on or associated with the power consuming components. For example, for each power consuming component, a supply line 222 fluidly connects the power consuming component and the supply manifold 200 to direct incoming thermal control fluid to the power consuming device, and a return line 224 fluidly connects the power consuming component and the return manifold 202 to direct returning thermal control fluid from the power consuming device to the heat exchanger/chiller 66.

FIG. 19 also depicts a control system 230 that can be used to control some or all of the system depicted in FIG. 19. For example, the control system 230 can be in communication with the pump 64 and each of the power sources 40, 57a, 57b, 57d, 57e, 57f. The control system 230 can also be in communication with the power conversion devices 48, 58b, 58d, 58c, 58f, flow control valves 232 in the supply line 222 and the return line 224, and communication interfaces 234 associated with the power consuming components 16, 18, 208, 210, 214, 218. The control system 230 can receive data inputs from the various elements to allow monitoring of performance. The control system 230 can also control operation of the various elements. For example, the control system 230 can determine which electrical power source(s) 40/44, 57a, 57b, 57d, 57e, 57f supplies electrical power to the bus 150 and/or direct electrical power from one power source, such as the power source 40/44, to the utility lines 57a and/or to the energy storage devices 57b. The control system 230 can also control the flow of thermal control fluid to and from the power consuming devices by controlling the flow control valves 232.

FIG. 20 illustrates a non-limiting example of how the bus 150, and the supply manifold 200 and the return manifold 202, can be integrated together in the common assembly 204. In this example, metallic pipes forming the supply manifold 200 and the return manifold 202 form the bus 150, with the pipe of the supply manifold 200 forming the positive portion of the bus 150 and the return manifold 202 forming the negative portion of the bus 150. The pipes can be formed of any material suitable for conducting electricity sufficient to act as a DC (or AC) bus. For example, the pipes can be made of metal including, but not limited to, copper, brass or aluminum. However, other techniques for integrating the bus 150 and the manifolds 200, 202 into the common assembly 204 are possible.

FIG. 20 also depicts an example of how the power consuming components 16, 18, 208, 210, 214, 218 can be fluidly and electrically connected to the assembly 204. For example, the hoses forming the supply line 222 and the return line 224 can be electrically conductive, and the control valves 232 can be zero leak fluid connectors that are also electrically conductive. Electrically conductive hoses and fluid connectors are known in the art and available from Parker Hannifin Corporation.

Additional aspects described herein can include the following:

An electrical generator can include:

an engine having a mechanical output; an electrical generating element connected to the mechanical output, the electrical generating element is configured to generate an alternating current; a power converter electrically connected to the electrical generating element and receiving the alternating current therefrom, the power converter is configured to convert the alternating current to a direct current; a direct current bus electrically connected to the power converter and receiving the direct current therefrom; a first electrical power output electrically connected to the direct current bus and that outputs a first type of electrical power; a second electrical power output electrically connected to the direct current bus and that outputs a second type of electrical power, where the second type of electrical power differs from the first type of electrical power; and a control system connected to the engine and that is configured to monitor a first load that electrically connects to the first electrical power output and/or monitor a second load that electrically connects to the second electrical power output, and the control system automatically adjusts output revolutions per minute of the engine based on the monitored first load and/or the second load.

The electrical generator can further include a plurality of power output modules, each one of the power output modules is removably installable on the electrical generator, a first one of the power output modules includes the first electrical power output and second one of the power output modules includes the second electrical power output. In an embodiment, each one of the power output modules can includes a bus connector at one thereof that electrically connects to the direct current bus.

In an embodiment, the direct current bus of the electrical generator is electrically connectable to utility power.

The electrical generator can further include a thermal control system that provides a thermal control fluid, at least one fluid outlet in the electrical generator from which the thermal control fluid can exit the electrical generator to an external device, and at least one fluid inlet through which the thermal control fluid can be returned into the electrical generator and to the thermal control system. In an embodiment, the thermal control system can include a heat exchanger through which the thermal control fluid is directed to adjust the temperature of the thermal control fluid. In another embodiment, the at least one fluid inlet and the at least one fluid outlet are disposed on a power output module that is removably installed on the electrical generator, and the power output module includes the first electrical power output or the second electrical power output.

The electrical generator can further include a paralleling module removably installed on the electrical generator and electrically connected to the direct current bus, and the paralleling module includes a plurality of positive terminals and a plurality of negative terminals.

In another embodiment, an electrical generator can include:
an engine having a mechanical output; an electrical generating element connected to the mechanical output, the electrical generating element is configured to generate an alternating current; a power converter electrically connected to the electrical generating element and receiving the alternating current therefrom, the power converter is configured to convert the alternating current to a direct current; a direct current bus electrically connected to the power converter and receiving the direct current therefrom; a plurality of modules each of which is removably installable on the electrical generator, each module includes a bus connector that electrically connects to the direct current bus when the module is installed on the electrical generator, a first one of the modules is configured to output a first type of electrical power at a first electrical power output when installed on the electrical generator to provide electrical power to a first load, and a second one of the modules is configured to output a second type of electrical power at a second electrical power output when installed on the electrical generator to provide electrical power to a second load, where the first type of electrical power differs from the second type of electrical power.

In the electrical generator of the preceding paragraph, the first one of the modules includes a first power converter and the first type of electrical power comprises a first alternating current, the second one of the modules includes a second power converter and the second type of electrical power comprises a second alternating current that differs from the first alternating current.

In another embodiment, in the electrical generator, the direct current bus can be electrically connectable to utility power.

The electrical generator can further include a thermal control system that provides a thermal control fluid, at least one fluid outlet in the electrical generator from which the thermal control fluid can exit the electrical generator to an external device, and at least one fluid inlet through which the thermal control fluid can be returned into the electrical generator and to the thermal control system. In an embodiment, the thermal control system can include a heat exchanger through which the thermal control fluid is directed to adjust the temperature of the thermal control fluid. In another embodiment, the at least one fluid inlet and the at least one fluid outlet are disposed on the first one of the modules or on the second one of the modules.

In another embodiment, in the electrical generator one of the modules can be a paralleling module that includes a plurality of positive terminals and a plurality of negative terminals.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An electrical generator comprising:
an electrical bus within the electrical generator, the electrical bus is electrically connectable to an electrical generating element that is within the electrical generator;
a plurality of modules each one of which is configured to be removably installable on the electrical generator, each module includes a bus connector on a wall thereof that electrically connects to the electrical bus when the module is installed on the electrical generator, and each module includes an electrical output;
a thermal control fluid bus assembly that includes quick connect fluid couplers;
at least one of the modules further includes a thermal control fluid inlet port and a thermal control fluid outlet port, and quick connect fluid connectors disposed on the wall thereof, the quick connect fluid connectors are separate from both the thermal control fluid inlet port and the thermal control fluid outlet port, the quick connect fluid connectors are configured to blind mate fluidly connect to the quick connect fluid couplers of the thermal control fluid bus assembly when the at least one module is installed on the electrical generator.

2. The electrical generator of claim 1, further comprising a thermal control module that is configured to be removably installable on the electrical generator, the thermal control module includes at least one thermal control fluid inlet port, at least one thermal control fluid outlet port, and quick connect fluid connectors that are configured to fluidly connect to the quick connect fluid couplers of the thermal control fluid bus assembly when the thermal control module is installed on the electrical generator.

3. The electrical generator of claim 1, wherein for each module, the electrical output outputs AC power or DC power.

4. The electrical generator of claim 1, wherein the electrical bus comprises a DC bus or an AC bus.

5. The electrical generator of claim 1, wherein at least one of the modules includes a power converter that converts DC power to AC power or that converts AC power to DC power.

6. The electrical generator of claim 1, wherein the electrical generating element comprises a permanent magnet motor.

7. The electrical generator of claim 1, wherein the electrical generator further includes an engine with an output shaft, and the electrical generating element is connected to the output shaft.

8. The electrical generator of claim 1, wherein the electrical bus is further electrically connectable to a source of electrical power that is external to the electrical generator.

9. An electrical generator comprising:
- an electrical bus within the electrical generator, the electrical bus is electrically connectable to an electrical generating element that is within the electrical generator;
- a thermal control fluid bus assembly that includes quick connect fluid couplers disposed next to the electrical bus;
- a plurality of modules each one of which is configured to be removably installable on the electrical generator;
- at least one of the modules is a power output module that includes a bus connector disposed on a rear side thereof that electrically connects to the electrical bus when the power output module is installed on the electrical generator, and the power output module includes an electrical output; and
- at least one of the modules is a thermal control module that includes at least one thermal control fluid inlet port, at least one thermal control fluid outlet port, and quick connect fluid connectors disposed on a rear side thereof that are configured to blind mate fluidly connect to the quick connect fluid couplers when the thermal control module is installed on the electrical generator.

10. The electrical generator of claim 9, wherein the power output module further includes a thermal control fluid inlet port, a thermal control fluid outlet port, and quick connect fluid connectors on the rear side thereof that are configured to blind mate fluidly connect to additional quick connect fluid couplers when the power output module is installed on the electrical generator.

11. The electrical generator of claim 9, comprising at least two of the power output modules.

12. The electrical generator of claim 9, wherein the electrical output outputs AC power or DC power.

13. The electrical generator of claim 9, wherein the electrical bus comprises a DC bus or an AC bus.

14. The electrical generator of claim 9, wherein the power output module includes a power converter that converts DC power to AC power or that converts AC power to DC power.

15. The electrical generator of claim 9, wherein the electrical generating element comprises a permanent magnet motor.

16. The electrical generator of claim 9, wherein the electrical generator further includes an engine with an output shaft, and the electrical generating element is connected to the output shaft.

17. The electrical generator of claim 9, wherein the electrical bus is further electrically connectable to a source of electrical power that is external to the electrical generator.

18. An electrical generator comprising:
- an electrical bus within the electrical generator, the electrical bus is electrically connectable to an electrical generating element that is within the electrical generator;
- a plurality of power output modules each one of which is configured to be removably installable on the electrical generator, each power output module includes a bus connector disposed at a rear side thereof that electrically blind mate connects to the electrical bus when the power output module is installed on the electrical generator;
- a first one of the power output modules includes a first power converter and a first electrical output at a front side thereof that outputs a first form of electrical power when installed on the electrical generator;
- a second one of the power output modules includes a second power converter and a second electrical output at a front side thereof that outputs a second form of electrical power when the first one of the power output modules is removed from the electrical generator and replaced with the second one of the power output modules;
- a slot in the electrical generator that is configured to separately receive the first one of the power output modules and the second one of the power output modules.

19. The electrical generator of claim 18, wherein the first one of the power output modules and the second one of the power output modules each includes: quick connect fluid connectors disposed on the rear side thereof that are configured to blind mate fluidly connect to a quick connect fluid couplers of the electrical generator; and a fluid inlet port and a fluid output port at the front side thereof.

* * * * *